United States Patent
Baskaran

(10) Patent No.: US 12,301,371 B2
(45) Date of Patent: May 13, 2025

(54) METHOD AND APPARATUS FOR IMPROVING RELIABILITY OF PHYSICAL DOWNLINK CONTROL CHANNEL IN WIRELESS NETWORK

(71) Applicant: Samsung Electronics Co., Ltd., Gyeonggi-do (KR)

(72) Inventor: Dhivagar Baskaran, Bangalore (IN)

(73) Assignee: Samsung Electronics Co., Ltd (KR)

( * ) Notice: Subject to any disclaimer, the term of this patent is extended or adjusted under 35 U.S.C. 154(b) by 314 days.

(21) Appl. No.: 18/016,938

(22) PCT Filed: Jun. 16, 2021

(86) PCT No.: PCT/KR2021/007557
§ 371 (c)(1),
(2) Date: Jan. 19, 2023

(87) PCT Pub. No.: WO2022/019483
PCT Pub. Date: Jan. 27, 2022

(65) Prior Publication Data
US 2023/0353291 A1 Nov. 2, 2023

(30) Foreign Application Priority Data

Jul. 20, 2020 (IN) .............................. 202041030929
Jul. 28, 2020 (IN) .............................. 202041032358
May 3, 2021 (IN) .............................. 202041030929

(51) Int. Cl.
*H04L 1/1867* (2023.01)
*H04W 8/24* (2009.01)

(52) U.S. Cl.
CPC ............... *H04L 1/189* (2013.01); *H04W 8/24* (2013.01)

(58) Field of Classification Search
CPC .......... H04L 1/189; H04L 1/08; H04L 1/1864; H04W 8/24
See application file for complete search history.

(56) References Cited

U.S. PATENT DOCUMENTS

2020/0022144 A1* 1/2020 Papasakellariou .... H04L 5/0053
2020/0045676 A1* 2/2020 Ryu ........................ H04L 5/001
(Continued)

FOREIGN PATENT DOCUMENTS

WO    WO 2020/142734    7/2020

OTHER PUBLICATIONS

NTT Docomo, Inc., "Enhancements on Multi-TRP/Panel Transmission", R1-1911184, 3GPP TSG RAN WG1 #98bis, Oct. 14-20, 2019, 32 pages.
(Continued)

*Primary Examiner* — Afshawn M Towfighi
(74) *Attorney, Agent, or Firm* — The Farrell Law Firm, P.C.

(57) ABSTRACT

Accordingly, the embodiment herein is to provide a method for improving reliability of a PDCCH in a wireless network. The method includes receiving an enable PDCCH repetition signal from a UE, wherein the enable PDCCH repetition signal indicates a capability of the UE to support a PDCCH information transmission over a plurality of occasions. Further, the method includes configuring the UE using a RRC parameter by transmitting a PDCCH repetition scheme signal to the UE, where the PDCCH repetition scheme indicates the PDCCH information transmission over the plurality of occasions. Further, the method includes associating the plurality of TCI states to a the PDCCH information by configuring a MAC-CE.

12 Claims, 16 Drawing Sheets

(56) References Cited

U.S. PATENT DOCUMENTS

2020/0106559 A1     4/2020  Vilaipornsawai et al.
2021/0195601 A1*    6/2021  Khoshnevisan ........ H04W 8/24
2024/0049312 A1*    2/2024  Zhang ................... H04L 5/0053

OTHER PUBLICATIONS

European Search Report dated Jan. 2, 2024 issued in counterpart application No. 21845370.2-1213, 8 pages.
PCT/ISA/210 Search Report issued on PCT/KR2021/007557, Sep. 7, 2021, pp. 4.
NTT Docomo, Inc, "Enhancements on multi-TRP/panel transmission", 3GPP TSG RAN WG1 #98 R1-1909201 Prague, CZ, Aug. 17, 2019, pp. 38.
Ericsson, "On multi-TRP and multi-panel", 3GPP TSG RAN WG1 Meeting RAN1#98 R1-1908990 Prague, Czech Republic, Aug. 16, 2019, pp. 23.
Panasonic, "On multi-TRP enhancements for NR MIMO in Rel. 16", 3GPP TSG RAN WG1 #98 R1-1908972 Prague, CZ, Aug. 16, 2019, pp. 18.

\* cited by examiner

METHOD AND APPARATUS FOR IMPROVING RELIABILITY OF PHYSICAL DOWNLINK CONTROL CHANNEL IN WIRELESS NETWORK

CROSS-REFERENCE TO RELATED APPLICATIONS

This application is a U.S. National Phase Entry of PCT International Application No. PCT/KR2021/007557, which was filed on Jun. 16, 2021, and claims priority to Indian patents application Nos. 202041030929, 202041032358, and 202041030929, which were filed in the Indian Intellectual Property Office on Jul. 20, 2020, Jul. 28, 2020, and May 3, 2021, respectively, the entire disclosure of each of which is incorporated herein by reference.

TECHNICAL FIELD

The present invention relates to a wireless network, and more specifically related to a method and apparatus for improving reliability of a Physical Downlink Control Channel (PDCCH) in the wireless network.

BACKGROUND ART

In general, for enhancing an existing 5th Generation (5G) New Radio (NR), control channel transmissions are being redesigned for better reliability and performance. One such enhancement is Multi Transmit Receive Point (Multi-TRP) (e.g. Evolved Node B (eNodeB), gNodeB) based enhancement of a PDCCH while transmitting PDCCH information over multiple transmission occasions in the PDCCH. The transmission occasions are separated by one or more in a time domain resource, a frequency domain resource, and a spatial domain resource of an Orthogonal frequency-division multiplexing (OFDM) signal. In the Multi-TRP, the PDCCH information is transmitted from each TRP to improve reliability. Reception of the PDCCH information from each TRP is expected to be associated with multiple transmission configuration information (TCI) state for successful decoding of the PDCCH information at a User Equipment (UE). But current specification of the NR does not support mapping of the multiple TCI states to a single PDCCH information using an existing structure of a MAC Control Element (MAC-CE). So, the existing structure of the MAC-CE is unable to support transmission of the single PDCCH information from different TRPs.

Thus, it is desired to provide at least one useful alternative to associate multiple TCI states to the single PDCCH information using a modified structure of MAC-CE to improve the reliability of the PDCCH.

DISCLOSURE OF INVENTION

Solution to Problem

The principal object of the embodiments herein is to provide a method for improving reliability of a PDCCH in a wireless network by associating multiple TCI states to a single PDCCH information using a modified structure of a MAC-CE.

Another object of the embodiments is to configure a control resource set of the MAC-CE with one or more TCI states which maps PDCCH transmission occasions with one or more of configured TCI states and relevant UE procedures to improve the reliability of the PDCCH by transmitting the single/same PDCCH information from different TRPs.

Another object of the embodiments is to use different TRPs to transmit the PDCCH and associating the reception with multiple TCI states, the reliability of the PDCCH is improved. This results in reduced hardware complexity in decoding the DCI information in the receiver.

Accordingly, the embodiment herein is to provide a method for improving reliability of a PDCCH in a wireless network. The method includes receiving, by a gNodeB (gNB), an enable PDCCH repetition signal from a UE, where the enable PDCCH repetition signal indicates capability of the UE to support a PDCCH information transmission over multiple occasions. Further, the method includes configuring, by the gNB, the UE using a Radio Resource Control (RRC) parameter by sending a PDCCH repetition scheme signal to the UE, where the PDCCH repetition scheme indicates the PDCCH information transmission over the multiple occasions. Further, the method includes associating, by the gNB, multiple TCI states to a single PDCCH information by configuring a MAC-CE to improve the reliability of the PDCCH in the wireless network.

In an embodiment, the method further includes receiving, by the UE, the RRC parameter and the configured MAC-CE from the gNB. Further, the method includes determining, by the UE, whether the configured MAC-CE comprises the multiple TCI states. Further, the method includes decoding, by the UE, the received PDCCH information transmission over multiple occasions with a single TCI state in response to determining that the configured MAC-CE does not comprise the multiple TCI states. Further, the method includes jointly decoding, by the UE, the received PDCCH information transmission over the multiple occasions with the multiple TCI states in response to determining that the configured MAC-CE comprises the multiple TCI states, where the multiple occasions are overlapped. Further, the method includes independently decoding, by the UE, the received PDCCH information transmission over the multiple occasions with the multiple TCI states in response to determining that the configured MAC-CE comprises the multiple TCI states, where the multiple occasions are not overlapped.

In an embodiment, the method further includes receiving, by the UE, the PDCCH information from the gNB. Further, the method includes determining, by the UE, whether the received PDCCH information comprises multiple MAC-CEs per control resource set. Further, the method includes decoding the received PDCCH information transmission over the multiple occasions with the single TCI state in response to determining that the received PDCCH information does not comprise the multiple MAC-CEs per control resource set. Further, the method includes jointly decoding the received PDCCH information transmission over the multiple occasions with the multiple TCI states in response to determining that the received PDCCH information comprises the multiple MAC-CEs per control resource set, where the multiple occasions are overlapped. Further, the method includes independently decoding the received PDCCH information transmission over the multiple occasions with the multiple TCI states in response to determining that the received PDCCH information comprises the multiple MAC-CEs per control resource set, where the multiple occasions are not overlapped.

In an embodiment, the method further includes receiving, by the UE, the PDCCH information from the gNB. Further, the method includes determining, by the UE, whether the received PDCCH information comprises multiple control resource set with same Identifier (ID) and different candidate bit, and the multiple MAC-CEs per control resource set. Further, the method includes decoding the received PDCCH information transmission over the multiple occasions with the single TCI state in response to determining that the received PDCCH information does not comprise the multiple control resource set with the same ID and the different candidate bit, and the multiple MAC-CEs per control resource set. Further, the method includes jointly decoding the received PDCCH information transmission over the multiple occasions with the multiple TCI states in response to determining that the received PDCCH information comprises the multiple control resource set with the same ID and the different candidate bit, and the multiple MAC-CEs per control resource set, where the multiple occasions are overlapped. Further, the method includes independently decoding the received PDCCH information transmission over the multiple occasions with the multiple TCI states in response to determining that the received PDCCH information comprises the multiple control resource set with the same ID and the different candidate bit, and the multiple MAC-CEs per control resource set, where the multiple occasions are not overlapped.

In an embodiment, the method further includes receiving, by the UE, the PDCCH information from the gNB. Further, the method includes determining, by the UE, whether the received PDCCH information comprises the multiple control resource set per search space with different TCI states. Further, the method includes decoding the received PDCCH information transmission over the multiple occasions with the single TCI state in response to determining that the received PDCCH information does not comprise the multiple control resource set per search space with different TCI states. Further, the method includes jointly decoding the received PDCCH information transmission over the multiple occasions with the multiple TCI states in response to determining that the received PDCCH information comprises the multiple control resource set per search space with different TCI states, where the multiple occasions are overlapped. Further, the method includes independently decoding the received PDCCH information transmission over the multiple occasions with the multiple TCI states in response to determining that the received PDCCH information comprises the multiple control resource set per search space with different TCI states, where the multiple occasions are not overlapped.

In an embodiment, the multiple occasions are based on one of a time domain resource, a frequency domain resource and a space domain resource of an OFDM signal.

In an embodiment, the MAC-CE comprises a serving cell Identity (ID), a coreset ID, a TCI state(s) and at least one candidate bit (e.g. C, TCI pool ID, core set pool ID, R, TCI state ID) in the TCI state.

In an embodiment, a structure of the MAC-CE is configured by one of: the MAC-CE has two 8-bit structure, where a first 8-bit structure of the MAC-CE comprises 5 bits of the serving cell ID and 3 bits of the coreset ID, and where a second 8-bit structure of the MAC-CE comprises 1 bit of the coreset ID, 1 bit of a candidate bit, and 6 bits of a first TCI state; the MAC-CE has three 8-bit structure of which last 8 bits are optional, where the first 8-bit structure of the MAC-CE comprises 5 bits of the serving cell ID and 3 bits of the coreset ID, where the second 8-bit structure of the MAC-CE comprises 1 bit of the coreset ID, 1 bit of the candidate bit, and 6 bits of the first TCI state, and where a third 8-bit structure of the MAC-CE comprises 2 bits of the candidate bit and 6 bits of a second TCI state; the MAC-CE has three 8-bit structure, where the first 8-bit structure of the MAC-CE comprises 5 bits of the serving cell ID and 3 bits of the coreset ID, where the second 8-bit structure of the MAC-CE comprises 1 bit of the coreset ID, 1 bit of the candidate bit, and 6 bits of the first TCI state, and where the third 8-bit structure of the MAC-CE comprises 1 bit of the candidate bit and 7 bits of a second TCI state; the MAC-CE has three 8-bit structure, where the first 8-bit structure of the MAC-CE comprises 5 bits of the serving cell ID and 3 bits of the coreset ID, where the second 8-bit structure of the MAC-CE comprises 1 bit of the coreset ID, and 7 bits of the first TCI state, and where the third 8-bit structure of the MAC-CE comprises 1 bit of the candidate bit and 7 bits of the second TCI state.

In an embodiment, the method further includes determining, by the UE, whether a value of the coreset ID is zero and a value of the candidate bit is zero. Further, the method includes mapping the TCI state from a Physical Downlink Shared Channel (PDSCH) configuration used as a default TCI state for a coreset with the coreset ID in response to determining that the value of the coreset ID is zero and the value of the candidate bit is zero. Further, the method includes mapping the TCI state from the PDSCH configuration used as the additional TCI state for the coreset with the coreset ID in response to determining that the value of the coreset ID is zero and the value of the candidate bit is not zero. Further, the method includes mapping the TCI state from a control resource set used as the default TCI state for the coreset with the coreset ID in response to determining that the value of the coreset ID is not zero and the value of the candidate bit is zero. Further, the method includes mapping the TCI state from the control resource set used as additional TCI state for the coreset with the coreset ID in response to determining that the value of the coreset ID is not zero and the value of the candidate bit is not zero.

In an embodiment, the method further includes receiving, by the UE, multiple configured MAC-CE from the gNB, where the multiple configured MAC-CE comprises the same coreset ID and the candidate bit with different value. Further, the method includes determining, by the UE, whether a value of the coreset ID is zero. Further, the method includes mapping the TCI state from the PDSCH configuration used as the TCI state for a coreset with the coreset ID and the candidate bit in response to determining that the value of the coreset ID is zero. Further, the method includes mapping the TCI state from a control resource set used as the TCI state for the coreset with the coreset ID and the candidate bit in response to determining that the value of the coreset ID is not zero.

Accordingly, the embodiments herein provide a gNB for improving reliability of a PDCCH in a wireless network. The gNB includes a PDCCH controller coupled with a processor and a memory. The PDCCH controller is configured to receive an enable PDCCH repetition signal from the UE, where the enable PDCCH repetition signal indicates capability of the UE to support a PDCCH information transmission over multiple occasions. Further, the PDCCH controller is configured to send a RRC parameter by sending a PDCCH repetition scheme signal to the UE, where the PDCCH repetition scheme indicates the PDCCH information transmission over the multiple occasions. Further, the PDCCH controller is configured to associate multiple TCI states to a single PDCCH information by configuring a MAC-CE to improve the reliability of the PDCCH in the wireless network.

Accordingly, the embodiments herein provide a UE for improving reliability of a PDCCH in a wireless network.

The UE includes a PDCCH controller coupled with a processor and a memory. The PDCCH controller is configured to receive RRC parameter and configured MAC-CE from a gNB. Further, the PDCCH controller is configured to determine whether the configured MAC-CE comprises multiple TCI states. Further, the PDCCH controller is configured to decode the received PDCCH information transmission over the multiple occasions with a single TCI state in response to determining that the configured MAC-CE does not comprise the multiple TCI states. Further, the PDCCH controller is configured to jointly decode the received PDCCH information transmission over the multiple occasions with the multiple TCI states in response to determining that the configured MAC-CE comprises the multiple TCI states, where the multiple occasions are overlapped. Further, the PDCCH controller is configured to independently decode the received PDCCH information transmission over the multiple occasions with the multiple TCI states in response to determining that the configured MAC-CE comprises the multiple TCI states, where the multiple occasions are not overlapped.

In an embodiment, the method further includes receiving an enable PDCCH repetition signal from a user equipment (UE), wherein the enable PDCCH repetition signal indicates a capability of the UE to support a PDCCH information transmission over a plurality of occasions; configuring the UE using a radio resource control (RRC) parameter to associate a plurality of transmission configuration information (TCI) states to PDCCH information by transmitting a PDCCH repetition scheme signal to the UE; and associating the plurality of TCI states to the PDCCH information based on the received capability of the UE, wherein the plurality of TCI states are configured by a medium access control element (MAC-CE).

In an embodiment, the method further includes receiving a radio resource control (RRC) parameter and a configured medium access control element (MAC-CE) from a gNodeB (gNB); determining whether the configured MAC-CE comprises a plurality of transmission configuration information (TCI) states; and performing one of: decoding PDCCH information with a single TCI state in response to determining that the configured MAC-CE does not comprise the plurality of TCI states; jointly decoding the PDCCH information with the plurality of TCI states in response to determining that the configured MAC-CE comprises the plurality of TCI states, wherein the PDCCH information is received over a plurality of overlapped occasions; and independently decoding the PDCCH information with the plurality of TCI states in response to determining that the configured MAC-CE comprises the plurality of TCI states, wherein the PDCCH information is received over a plurality of non-overlapped occasions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

MODE FOR THE INVENTION

Figure 1:
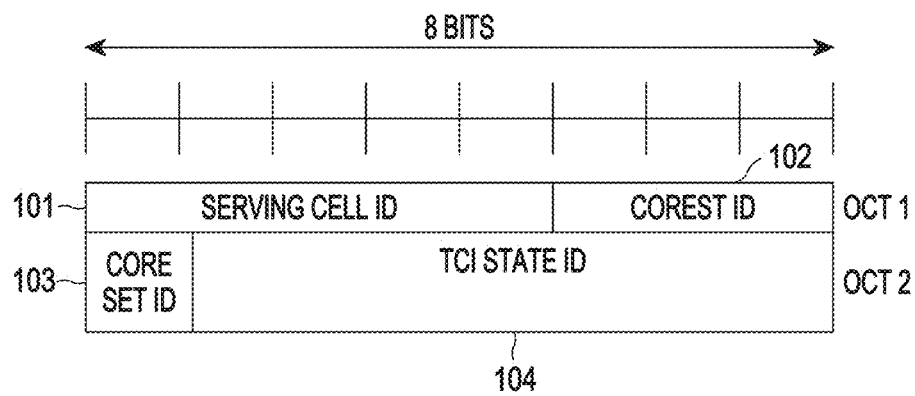
FIG. 1 illustrates a TCI state indication for a UE-specific PDCCH MAC-CE, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a method for improving reliability of a PDCCH in a wireless network. The method includes receiving, by a gNB, an enable PDCCH repetition signal from a UE, where the enable PDCCH repetition signal indicates capability of the UE to support a PDCCH information transmission over multiple occasions. Further, the method includes configuring, by the gNB, the UE using a Radio Resource Control (RRC) parameter by sending a PDCCH repetition scheme signal to the UE, where the PDCCH repetition scheme indicates the PDCCH information transmission over the multiple occasions. Further, the method includes associating, by the gNB, multiple TCI states to a single PDCCH information by configuring a MAC-CE to improve the reliability of the PDCCH in the wireless network.

Accordingly, the embodiments herein provide a gNB for improving reliability of a PDCCH in a wireless network. The gNB includes a PDCCH controller coupled with a processor and a memory. The PDCCH controller is configured to receive an enable PDCCH repetition signal from the UE, where the enable PDCCH repetition signal indicates capability of the UE to support a PDCCH information transmission over multiple occasions. Further, the PDCCH controller is configured to send a RRC parameter by sending a PDCCH repetition scheme signal to the UE, where the PDCCH repetition scheme indicates the PDCCH information transmission over the multiple occasions. Further, the PDCCH controller is configured to associate multiple TCI states to a single PDCCH information by configuring a MAC-CE to improve the reliability of the PDCCH in the wireless network.

Accordingly, the embodiments herein provide a UE for improving reliability of a PDCCH in a wireless network. The UE includes a PDCCH controller coupled with a processor and a memory. The PDCCH controller is configured to receive RRC parameter and configured MAC-CE from a gNB. Further, the PDCCH controller is configured to determine whether the configured MAC-CE comprises multiple TCI states. Further, the PDCCH controller is configured to decode the received PDCCH information transmission over multiple occasions with a single TCI state in response to determining that the configured MAC-CE does not comprise the multiple TCI states. Further, the PDCCH controller is configured to jointly decode the received PDCCH information transmission over the multiple occasions with the multiple TCI states in response to determining that the configured MAC-CE comprises the multiple TCI states, where the multiple occasions are overlapped. Further, the PDCCH controller is configured to independently decode the received PDCCH information transmission over the multiple occasions with the multiple TCI states in response to determining that the configured MAC-CE comprises the multiple TCI states, where the multiple occasions are not overlapped. The PDCCH information transmission over multiple occasions means the PDCCH information is transmitted over a plurality of times. "The multiple occasions are overlapped" means at least one of time, frequency and space is overlapped in the context of OFDM technology with MIMO.

Unlike existing methods and systems, the proposed method allows the gNB and the UE to associate the multiple TCI states to the single PDCCH information using a modified structure of the MAC-CE for improving the reliability of the PDCCH in the wireless network.

Unlike existing methods and systems, the proposed method allows the gNB and the UE to configure a control resource set of the MAC-CE with the one or more TCI states which map PDCCH transmission occasions with one or more of the configured TCI states and the relevant UE procedures to improve the reliability of the PDCCH by transmitting single/same PDCCH information from different TRPs.

FIG. 1 illustrates a TCI state indication for a UE-specific PDCCH MAC-CE, according to the prior art defined in section 6.1.3.15 of 3GPP TS 38.321 version 15.3.0 Release 15. The TCI state indication for the UE-specific PDCCH MAC-CE is identified by a MAC sub header with a Logical Channel ID (LCID) as specified in Table 6.2.1-1 of 3GPP TS 38.321 version 15.3.0 Release 15. The LCID field identifies the logical channel instance of the corresponding MAC SDU or the type of the corresponding MAC CE. The existing MAC-CE has a fixed size of 16 bits fields: a serving cell ID (101), a coreset ID (102,103), and a TCI state ID (104).

The serving cell ID (101) field indicates an identity of the serving cell for which the MAC-CE applies. The length of the field (101) is 5 bits. If the indicated serving cell is configured as part of a simultaneousTCI-UpdateList1-r16 or a simultaneousTCI-UpdateList2-r16 as specified in TS 38.331, the MAC-CE applies to all serving cells in a set of the simultaneousTCI-UpdateList1-r16 or the simultaneousTCI-UpdateList2-r16 respectively. The coreset ID (102, 103) field indicates a control resource set identified with a control resource set ID as specified in TS 38.331, for which the TCI state is being indicated. In case a value of the field is 0, the field refers to the Control Resource Set configured by a control resource set Zero as specified in TS 38.331. The length of the field (102,103) is 4 bits. The TCI state ID (104) field indicates the TCI state identified by TCI-State ID as specified in TS 38.331 applicable to the control resource set identified by coreset ID field. If the field of the coreset ID (102,103) is set to 0, this field indicates a TCI-StateId for a TCI state of first 64 TCI-states configured by a tci-States-ToAddModList and a tci-States-ToReleaseList in a PDSCH-Config in an active BWP. If the field of the coreset ID (102,103) is set to values other than 0, this field indicates a TCI-StateIDconfigured by a tci-StatesPDCCH-ToAddList and a tci-StatesPDCCH-ToReleaseList in the control resource set identified by the indicated coreset ID. The length of the field (104) is 7 bits.

Because of the fixed size of 16 bits fields, the current release of the NR standards do not have a valid process for the same PDCCH information is transmitted from different TRPs with more than one associated TCI for the same PDCCH information which is activated using the MAC-CE.

Referring now to the drawings and more particularly to FIGS. 2A through 8E, where similar reference characters denote corresponding features consistently throughout the figures, there are shown preferred embodiments.

Figure 2A:
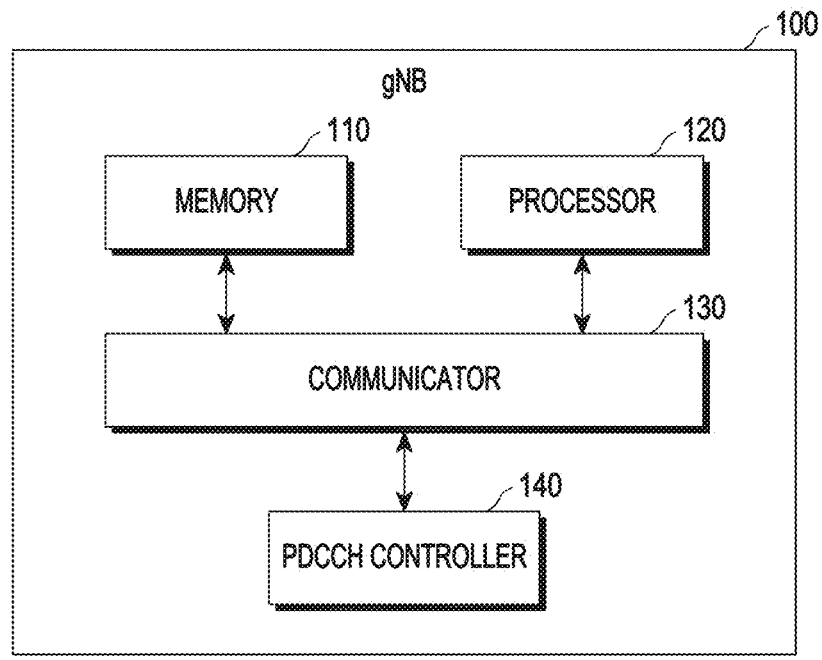
FIG. 2A illustrates a block diagram of a gNB for improving reliability of a PDCCH in a wireless network, according to the embodiments as disclosed herein.

FIG. 2A illustrates a block diagram of a gNB (100) for improving the reliability of a PDCCH in a wireless network, according to the embodiments as disclosed herein. In an embodiment, the gNB (100) includes a memory (110), a processor (120), a communicator (130), and a PDCCH controller (140).

In an embodiment, the memory (110) is configured to store a configuration of a capability of a UE (200), a RRC parameter and MAAC-CE configuration(s). The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In certain examples, a non-transitory storage medium may store data that can, over time, change (e.g., in Random Access Memory (RAM) or cache). The memory (110) can be an internal storage unit or it can be an external storage unit of the gNB (100), a cloud storage, or any other type of external storage.

The processor (120) communicates with the memory (110), the communicator (130), and the PDCCH controller (140). The processor (120) is configured to execute instructions stored in the memory (110) and to perform various processes. The processor (120) may include one or a plurality of processors, maybe a general-purpose processor, such as a Central Processing Unit (CPU), an Application Processor (AP), or the like, a graphics-only processing unit such as a Graphics Processing Unit (GPU), a Visual Processing Unit (VPU), and/or an Artificial intelligence (AI) dedicated processor such as a Neural Processing Unit (NPU).

The communicator (130) is configured for communicating internally between internal hardware components and with external devices (e.g. UE (200)) via one or more networks (e.g. internet, Wi-Fi, Bluetooth, etc.). The communicator (130) includes an electronic circuit specific to a standard that enables wired or wireless communication. The communicator (130) may be referred to as a transceiver.

The PDCCH controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the PDCCH controller (140) is configured to receive an enable PDCCH repetition signal from the UE (200), where the enable PDCCH repetition signal indicates a capability of the UE (200) to support a PDCCH information transmission over multiple occasions. The multiple occasions are separated by one of a time domain resource, a frequency domain resource and a space domain resource of an OFDM signal. Further, the PDCCH controller (140) configures the UE (200) using a Radio Resource Control (RRC) parameter by sending a PDCCH repetition scheme signal to the UE (200), where the PDCCH repetition scheme indicates the PDCCH information transmission over the multiple occasions. Further, the PDCCH controller (140) is configured to associate multiple TCI states to a single PDCCH information by configuring a MAC-CE to improve the reliability of the PDCCH in the wireless network. The PDCCH controller (140) may be incorporated in the processor (120).

In an embodiment, the MAC-CE comprises a serving cell Identity (ID), a coreset ID, a TCI state and a candidate bit (e.g. C, TCI pool ID, core set pool ID, R, TCI state ID) in the TCI state.

In an embodiment, a structure of the MAC-CE comprises one of: the MAC-CE has two 8-bit structure, where a first 8-bit structure of the MAC-CE comprises 5 bits of the serving cell ID and 3 bits of the coreset ID, and where a second 8-bit structure of the MAC-CE comprises 1 bit of the coreset ID, 1 bit of a candidate bit, and 6 bits of a first TCI state; the MAC-CE has three 8-bit structure of which last 8 bits are optional, where the first 8-bit structure of the MAC-CE comprises 5 bits of the serving cell ID and 3 bits of the coreset ID, where the second 8-bit structure of the MAC-CE comprises 1 bit of the coreset ID, 1 bit of the candidate bit, and 6 bits of the first TCI state, and where a third 8-bit structure of the MAC-CE comprises 2 bits of the candidate bit and 6 bits of a second TCI state; the MAC-CE has three 8-bit structure, where the first 8-bit structure of the MAC-CE comprises 5 bits of the serving cell ID and 3 bits of the coreset ID, where the second 8-bit structure of the MAC-CE comprises 1 bit of the coreset ID, 1 bit of the candidate bit, and 6 bits of the first TCI state, and where the third 8-bit structure of the MAC-CE comprises 1 bit of the first TCI state and 7 bits of a second TCI state; and the MAC-CE has three 8-bit structure, where the first 8-bit structure of the MAC-CE comprises 5 bits of the serving cell ID and 3 bits of the coreset ID, where the second 8-bit structure of the MAC-CE comprises 1 bit of the coreset ID, and 7 bits of the first TCI state, and where the third 8-bit structure of the MAC-CE comprises 1 bit of the candidate bit and 7 bits of the second TCI state. Detailed descriptions of various MAC-CE structures with example scenarios are given in the FIG. 4A to FIG. 8D.

Although the FIG. 2A shows various hardware components of the gNB (100) but it is to be understood that other embodiments are not limited thereon. In other embodiments, the gNB (100) may include less or more number of components. Further, the labels or names of the components are used only for illustrative purpose and does not limit the scope of the invention. One or more components can be combined together to perform same or substantially similar function to improve the reliability of the PDCCH in the wireless network.

Figure 2B:
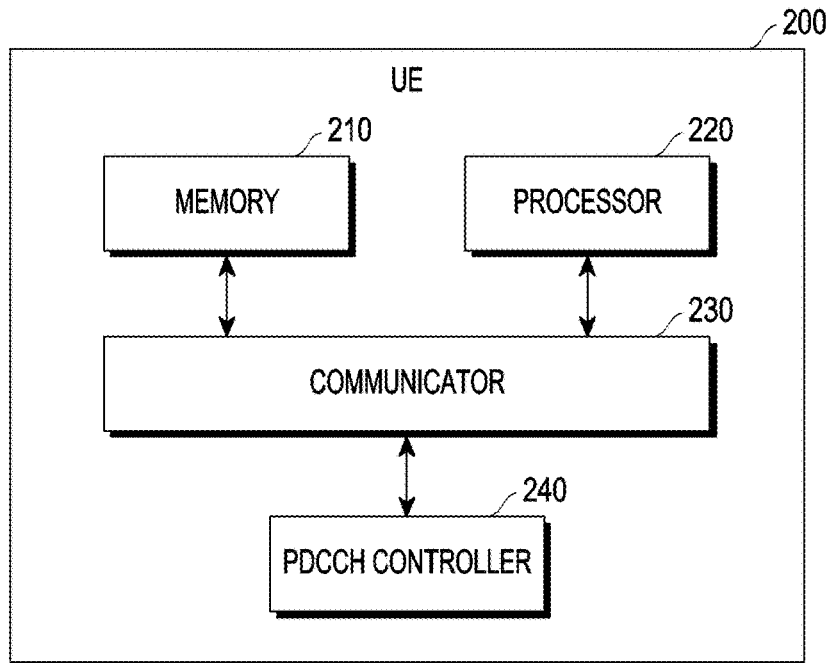
FIG. 2B illustrates a block diagram of a UE for improving the reliability of the PDCCH in the wireless network, according to the embodiments as disclosed herein.

FIG. 2B illustrates a block diagram of the UE (200) for improving the reliability of the PDCCH in the wireless network, according to the embodiments as disclosed herein. In an embodiment, the UE (200) includes a memory (210), a processor (220), a communicator (230), and a PDCCH controller (240).

In an embodiment, the memory (210) is configured to store the configuration of the capability of the UE (200), the RRC parameter and the MAAC-CE configuration(s). The memory (210) stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In certain examples, a non-transitory storage medium may store data that can, over time, change (e.g., in Random Access Memory (RAM) or cache). The memory (210) can be an internal storage unit or it can be an external storage unit of the UE (200), a cloud storage, or any other type of external storage.

The processor (220) communicates with the memory (210), the communicator (230), and the PDCCH controller (240). The processor (220) is configured to execute instructions stored in the memory (210) and to perform various processes. The processor (220) may include one or a plurality of processors, maybe a general-purpose processor, such as a Central Processing Unit (CPU), an Application Processor (AP), or the like, a graphics-only processing unit such as a Graphics Processing Unit (GPU), a Visual Processing Unit (VPU), and/or an Artificial intelligence (AI) dedicated processor such as a Neural Processing Unit (NPU).

The communicator (230) is configured for communicating internally between internal hardware components and with external devices (e.g. gNB (100)) via one or more networks (e.g. internet, Wi-Fi, Bluetooth, etc.). The communicator (230) includes an electronic circuit specific to a standard that enables wired or wireless communication. The communicator (230) may be referred to as a transceiver.

The PDCCH controller (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the PDCCH controller (240) is configured to receive the RRC parameter and the configured MAC-CE from the gNB (100). Further, the PDCCH controller (240) is configured to determine whether the configured MAC-CE comprises the multiple TCI states. Further, the PDCCH controller (240) is configured to decode the received PDCCH information transmission over the multiple occasions with a single TCI state in response to determining that the configured MAC-CE does not comprise the multiple TCI states. Further, the PDCCH controller (240) is configured to jointly decode the received PDCCH information transmission over the multiple occasions with the multiple TCI states in response to determining that the configured MAC-CE comprises the multiple TCI states, where the multiple occasions are overlapped. Further, the PDCCH controller (240) is configured to independently decode the received PDCCH information transmission over the multiple occasions with the multiple TCI states in response to determining that the configured MAC-CE comprises the multiple TCI states, where the multiple occasions are not overlapped.

In an embodiment, the PDCCH controller (240) is configured to receive the PDCCH information from the gNB (100). Further, the PDCCH controller (240) is configured to determine whether the received PDCCH information comprises the multiple MAC-CEs per control resource set. Further, the PDCCH controller (240) is configured to decode the received PDCCH information transmission over the multiple occasions with the single TCI state in response to determining that the received PDCCH information does not comprise the multiple MAC-CEs per control resource set. Further, the PDCCH controller (240) is configured to jointly decode the received PDCCH information transmission over the multiple occasions with the multiple TCI states in response to determining that the received PDCCH information comprises the multiple MAC-CEs per control resource set, where the multiple occasions are overlapped. Further, the PDCCH controller (240) is configured to independently decode the received PDCCH information transmission over the multiple occasions with the multiple TCI states in response to determining that the received PDCCH information comprises the multiple MAC-CEs per control resource set, where the multiple occasions are not overlapped.

In an embodiment, the PDCCH controller (240) is configured to determine whether the received PDCCH information comprises multiple control resource set with a same ID and a different candidate bit, and the multiple MAC-CEs per control resource set. Further, the PDCCH controller (240) is configured to decode the received PDCCH information transmission over the multiple occasions with the single TCI state in response to determining that the received PDCCH information does not comprise the multiple control resource set with the same ID and the different candidate bit, and the multiple MAC-CEs per control resource set. Further, the PDCCH controller (240) is configured to jointly decode the received PDCCH information transmission over the multiple occasions with the multiple TCI states in response to determining that the received PDCCH information comprises the multiple control resource set with the same ID and the different candidate bit, and the multiple MAC-CEs per control resource set, where the multiple occasions are overlapped. Further, the PDCCH controller (240) is configured to independently decode the received PDCCH information transmission over the multiple occasions with the multiple TCI states in response to determining that the received PDCCH information comprises the multiple control resource set with the same ID and the different candidate bit, and the multiple MAC-CEs per control resource set, where the multiple occasions are not overlapped.

In an embodiment, the PDCCH controller (240) is configured to determine whether the received PDCCH information comprises the multiple control resource set per search space with different TCI states. Further, the PDCCH controller (240) is configured to decode the received PDCCH information transmission over the multiple occasions with the single TCI state in response to determining that the received PDCCH information does not comprise the multiple control resource set per search space with the different TCI states. Further, the PDCCH controller (240) is configured to jointly decode the received PDCCH information transmission over the multiple occasions with the multiple TCI states in response to determining that the received PDCCH information comprises the multiple control resource set per search space with the different TCI states, where the multiple occasions are overlapped. Further, the PDCCH controller (240) is configured to independently decode the received PDCCH information transmission over the multiple occasions with the multiple TCI states in response to determining that the received PDCCH information comprises the multiple control resource set per search space with the different TCI states, where the multiple occasions are not overlapped.

In an embodiment, the PDCCH controller (240) is configured to determine whether a value of the coreset ID is zero and a value of the candidate bit is zero. Further, the PDCCH controller (240) is configured to map the TCI state from a Physical Downlink Shared Channel (PDSCH) configuration used as a default TCI state for a coreset with the coreset ID in response to determining that the value of the coreset ID is zero and the value of the candidate bit is zero. Further, the PDCCH controller (240) is configured to map the TCI state from the PDSCH configuration used as the additional TCI state for the coreset with the coreset ID in response to determining that the value of the coreset ID is zero and the value of the candidate bit is not zero. Further, the PDCCH controller (240) is configured to map the TCI state from a control resource set used as the default TCI state for the coreset with the coreset ID in response to determining that the value of the coreset ID is not zero and the value of the candidate bit is zero. Further, the PDCCH controller (240) is configured to map the TCI state from the control resource set used as additional TCI state for the coreset with the coreset ID in response to determining that the value of the coreset ID is not zero and the value of the candidate bit is not zero.

In an embodiment, the PDCCH controller (240) is configured to receive multiple configured MAC-CE from the gNB (100), where the multiple configured MAC-CE comprises the same coreset ID and the candidate bit with different value. Further, the PDCCH controller (240) is configured to determine whether the value of the coreset ID is zero. Further, the PDCCH controller (240) is configured to map the TCI state from the PDSCH configuration used as the TCI state for the coreset with the coreset ID and the candidate bit in response to determining that the value of the coreset ID is zero. Further, the PDCCH controller (240) is configured to map the TCI state from the control resource set used as the TCI state for the coreset with the coreset ID and the candidate bit in response to determining that the value of the coreset ID is not zero. The PDCCH controller (240) may be incorporated in the processor (220).

Although the FIG. 2B shows various hardware components of the UE (200) but it is to be understood that other embodiments are not limited thereon. In other embodiments, the UE (200) may include less or more number of components. Further, the labels or names of the components are used only for illustrative purpose and does not limit the scope of the invention. One or more components can be combined together to perform same or substantially similar function to improve the reliability of the PDCCH in the wireless network.

Figure 3:
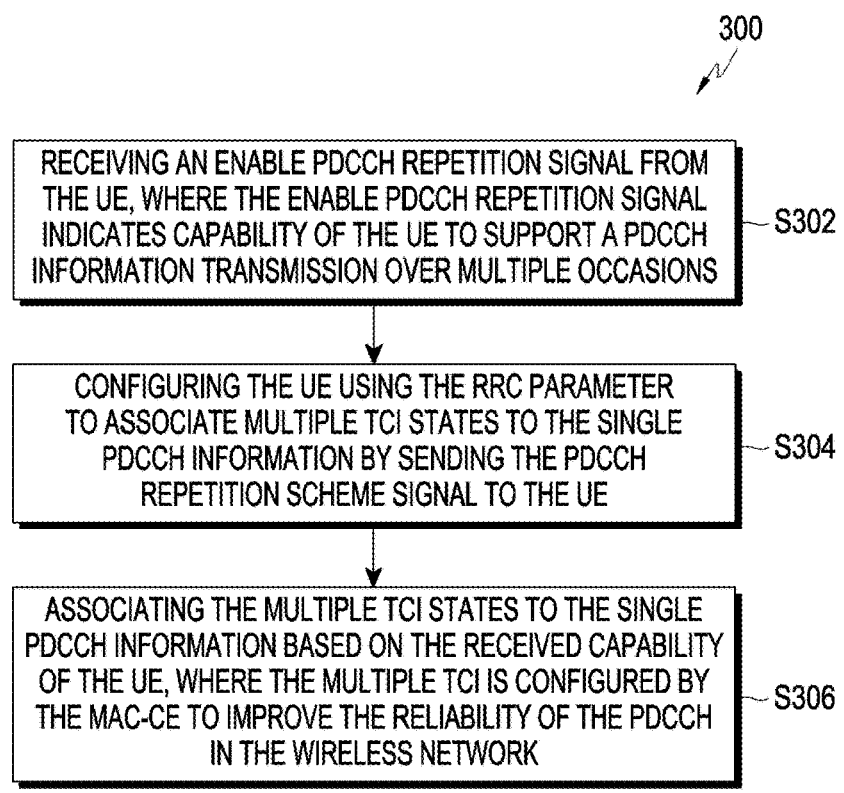
FIG. 3 is a flow diagram illustrating a method for improving the reliability of the PDCCH in the wireless network, according to the embodiments as disclosed herein.

FIG. 3 is a flow diagram (300) illustrating a method for improving the reliability of the PDCCH in the wireless network, according to the embodiments as disclosed herein. The operations (S302-S306) are performed by the gNB (100).

At S302, the method includes receiving the enable PDCCH repetition signal from the UE (200), where the enable PDCCH repetition signal indicates capability of the UE (200) to support the PDCCH information transmission over the multiple occasions. At S304, the method includes configuring the UE (200) using the RRC parameter to associate multiple TCI states to the single PDCCH information by sending the PDCCH repetition scheme signal to the UE (200), where the PDCCH repetition scheme indicates the PDCCH information transmission over the multiple occasions. At S306, the method includes associating the multiple TCI states to the single PDCCH information based on the received capability of the UE (200), where the multiple TCI states is configured by the MAC-CE to improve the reliability of the PDCCH in the wireless network.

The various actions, acts, blocks, steps, or the like in the flow diagram (300) may be performed in the order presented, in a different order or simultaneously. Further, in some embodiments, some of the actions, acts, blocks, steps, or the like may be omitted, added, modified, skipped, or the like without departing from the scope of the invention.

Figure 4A:
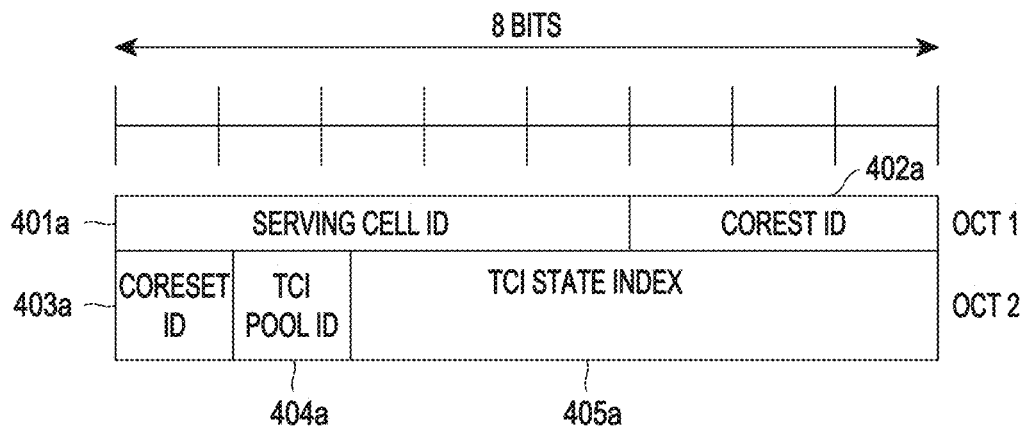
FIG. 4A illustrate a first MAC-CE structure for improving the reliability of the PDCCH in the wireless network, according to the embodiments as disclosed herein.

FIG. 4A illustrate a first MAC-CE structure for improving the reliability of the PDCCH in the wireless network, according to the embodiments as disclosed herein.

In an embodiment, the first MAC-CE structure/proposed MAC-CE structure associates the multiple TCI states to the single PDCCH information. The first MAC-CE structure contains one-bit information namely a TCI pool ID (404a) and a TCI state index (405a) which maps to the desired TCI state, along with the serving cell ID (401a) and the coreset ID (402a,403a).

In an embodiment, the TCI state index (405a) indicates an index of the TCI state applicable to the control resource set identified by the coreset ID field (402a, 403a). If the field of the coreset ID is set to 0, the field indicates an index of the TCI state from the first 64 TCI-states configured by a tci-States-ToAddModList and a tci-States-ToReleaseList in a PDSCH-Config in an active Bandwidth Part (BWP). If the field of the coreset ID is set to values other than 0, the field indicates the index of the TCI state configured by a tci-StatesPDCCH-ToAddList and a tci-StatesPDCCH-ToReleaseList in the control resource set identified by the indicated coreset ID. The length of the field (405a) is 6 bits.

In an embodiment, the TCI pool ID (404a) indicates a one-bit field that represents whether the MAC-CE indicates the default TCI state or the additional TCI state for the control resource set identified by the indicated coreset ID. Setting the value to 0, which indicates that the default TCI state is derived from TCI State Index to be associated with the control resource set. Setting the value to 1, which indicates that the additional TCI state is derived from the TCI state index to be associated with the control resource set.

Figure 4B:
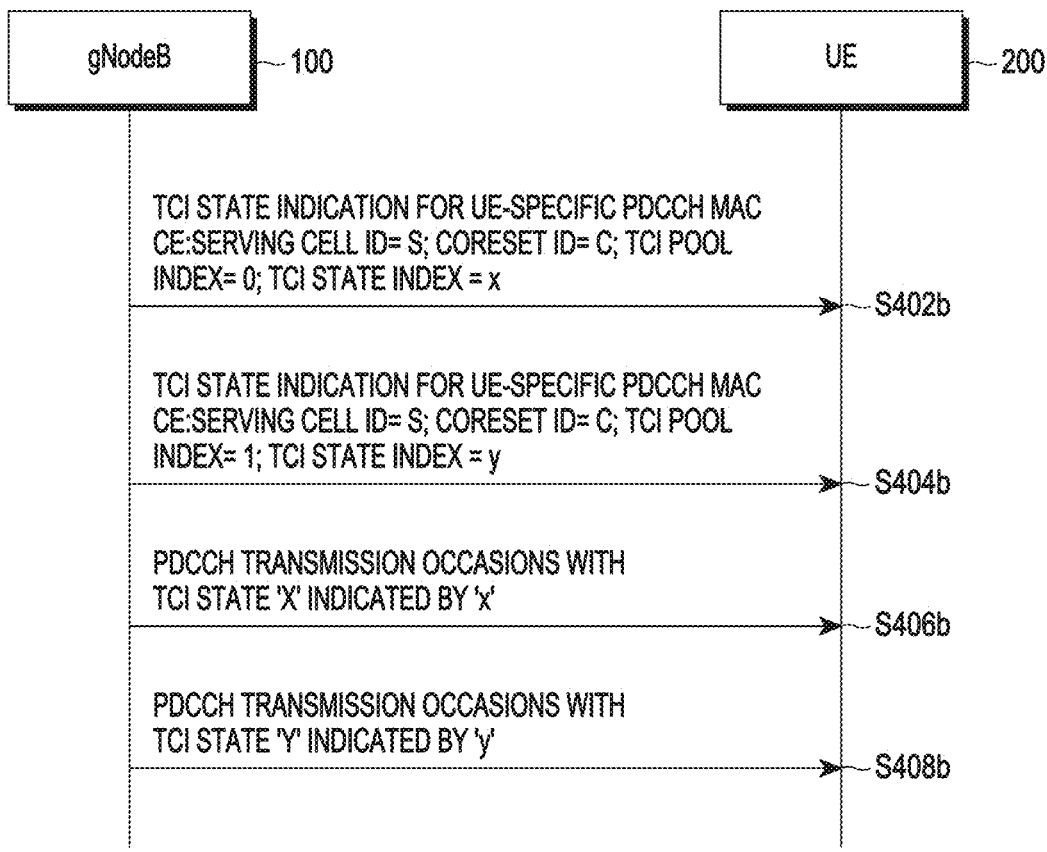
FIG. 4B illustrate a signalling between the gNB and the UE using the first MAC-CE structure, according to the embodiments as disclosed herein.

FIG. 4B illustrate a signalling between the gNB (100) and the UE (200) using the first MAC-CE structure, according to the embodiments as disclosed herein. The operations (S402b-S408b) are performed by the gNB (100).

At S402b-S404b, to associate the multiple TCI states to the single PDCCH information, two MAC-CEs with different TCI Pool ID (i.e. TCI pool index=0 and TCI pool index=1) values and different TCI state indexes are signalled each mapping the same control resource set identified by the indicated coreset ID (e.g. Coreset ID=C). At S406b-S408b, which configures one or more of the PDCCH transmission occasions mapped to one of the TCI states, and remaining one or more of the PDCCH transmission occasions mapped to another of the TCI states, indicated by the respective MAC-CEs. For the case of the multiple transmission occasions with the single TCI state, a single MAC-CE with the TCI pool ID value of zero is signalled to map the desired TCI state to the control resource set identified by the indicated coreset ID. Now all the PDCCH transmission occasions are mapped to the TCI state indicated by the MAC-CE.

Figure 4C:
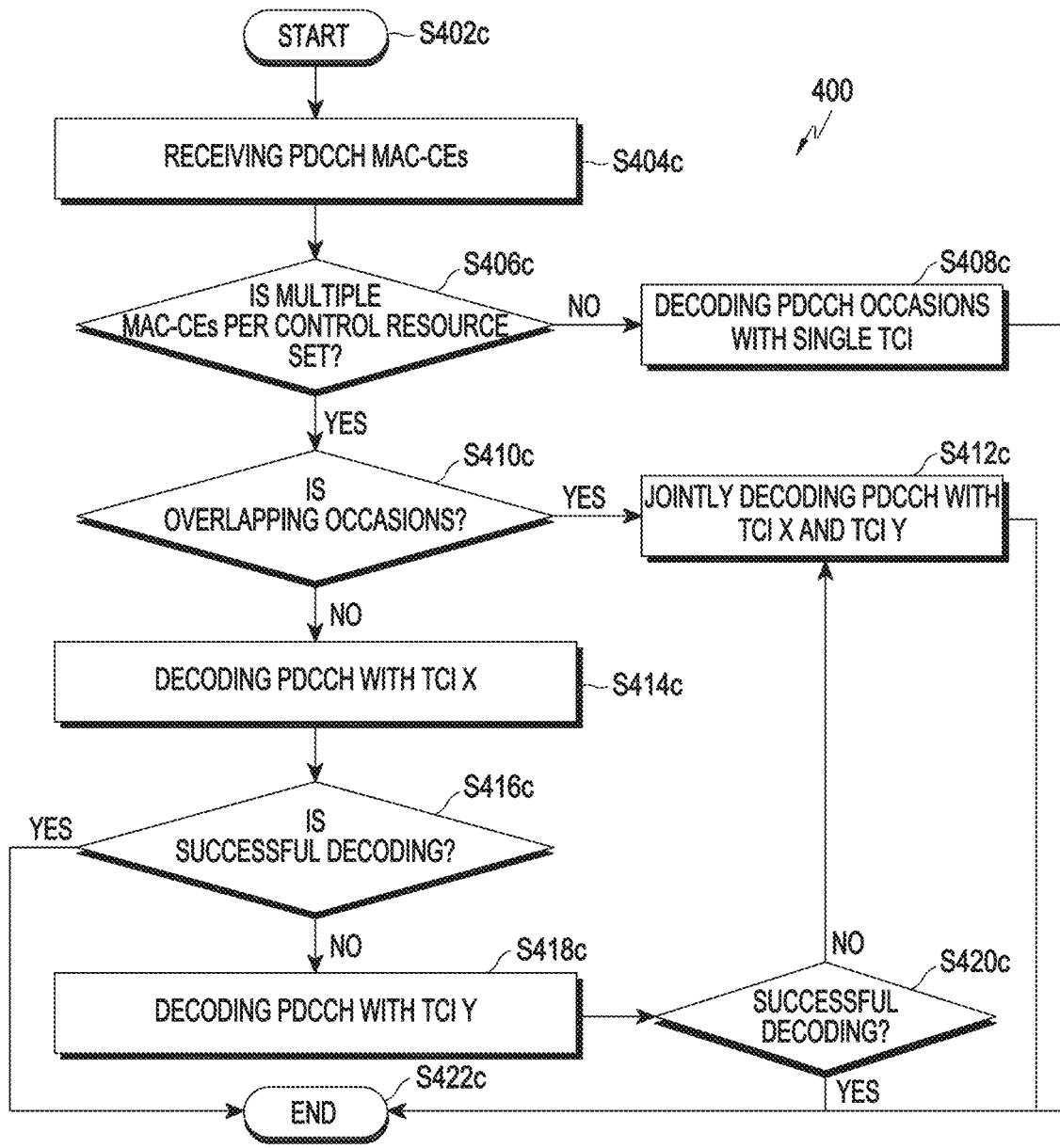
FIG. 4C is a flow diagram illustrating various operations for decoding of the first MAC-CE structure at the UE, according to the embodiments as disclosed herein.

FIG. 4C is a flow diagram (400) illustrating various operations for decoding the first MAC-CE structure at the UE (200), according to the embodiments as disclosed herein. The operations (S402c-S422c) are performed by the UE (200).

At S402c-S404c, on receiving two MAC-CEs (PDCCH MAC-CEs) with the same coreset ID, different TCI pool ID, and different TCI state index, the UE (200) expects one or more of the configured PDCCH transmission occasions mapped to one of the TCI states and one or more of the configured PDCCH transmission occasions are mapped to another of the TCI states, indicated by the respective MAC-CEs.

At S406c, the UE (200) determines whether the received PDCCH information comprises the multiple MAC-CEs per control resource set. At S408c, the UE (200) decodes the received PDCCH information transmission over the multiple occasions with the single TCI state in response to determining that the received PDCCH information does not comprise multiple MAC-CEs per control resource set. At S410c, the UE (200) determines whether the received PDCCH information have the multiple occasions with overlapping in response to determining that the received PDCCH information comprises the multiple MAC-CEs per control resource set.

At S412c, the UE (200) jointly decodes the received PDCCH information transmission over the multiple occasions with the multiple TCI states (i.e. TCI x and TCI y) in response to determining that the received PDCCH information have the multiple occasions with overlapping. At S414c-S418c, the UE (200) independently decodes the received PDCCH information transmission over the multiple occasions with the multiple TCI states in response to determining that the received PDCCH information have the multiple occasions without overlapping. At 420c-422c, the UE (200) determines whether the independently decodes the received PDCCH information transmission over the multiple occasions with the multiple TCI states is successful. The UE (200) jointly decodes the received PDCCH information transmission over the multiple occasions with the multiple TCI states in response to determining that the independently decodes the received PDCCH information transmission over the multiple occasions with the multiple TCI states is not successful. The UE (200) processes the PDCCH across multiple occasions is performed by one or more of independently decoding each PDCCH occasion with the respective TCI state and by jointly decoding the PDCCH occasions across one or more of the TCI states.

The various actions, acts, blocks, steps, or the like in the flow diagram (400) may be performed in the order presented, in a different order or simultaneously. Further, in some embodiments, some of the actions, acts, blocks, steps, or the like may be omitted, added, modified, skipped, or the like without departing from the scope of the invention.

Figure 5A:
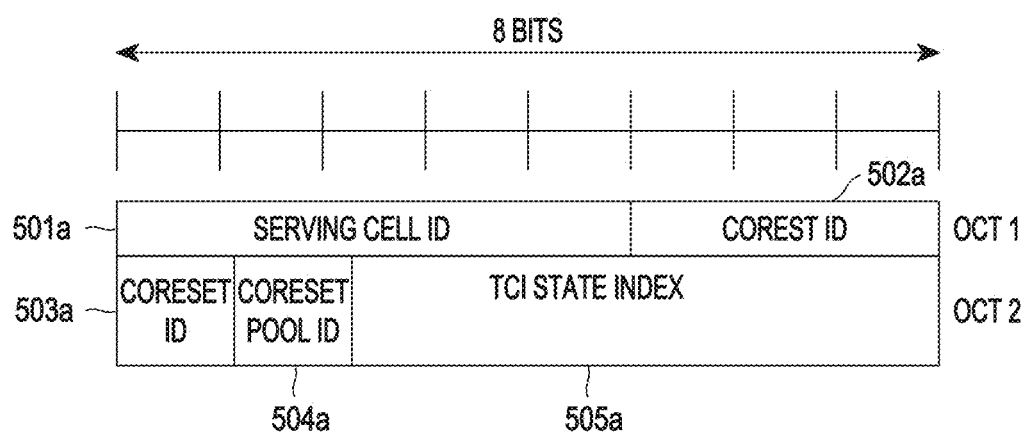
FIG. 5A illustrate a second MAC-CE structure for improving the reliability of the PDCCH in the wireless network, according to the embodiments as disclosed herein.

FIG. 5A illustrate a second MAC-CE structure for improving the reliability of the PDCCH in the wireless network, according to the embodiments as disclosed herein.

In an embodiment, the second MAC-CE structure/proposed MAC-CE structure associates the multiple TCI states to the single PDCCH information. The second MAC-CE structure contains a one-bit information namely the coreset pool ID (504a) and the TCI state index (505a) which maps to the desired TCI state, along with the serving cell ID (501a) and the coreset ID (502a, 503a).

In an embodiment, the TCI state index (505a) indicates the index of the TCI state applicable to the control resource set identified by the coreset ID field and the coreset pool ID. If the field of the coreset ID (502a, 503a) is set to 0, the field indicates the index of the TCI state of the first 64 TCI-states configured by the tci-States-ToAddModList and the tci-States-ToReleaseList in the PDSCH-configuration in the active BWP. If the field of the coreset ID (502a, 503a) is set to the other value than 0, the field indicates the index of the TCI state configured by the tci-StatesPDCCH-ToAddList and the tci-StatesPDCCH-ToReleaseList in the control resource set identified by the indicated coreset ID. The length of the field (505a) is 6 bits.

In an embodiment, the coreset pool ID (504a) field along with the coreset ID indicates the control resource set for which the TCI state derived from the MAC-CE is applied. The length of the field (504a) is 1 bit taking a value of zero or one.

Figure 5B:
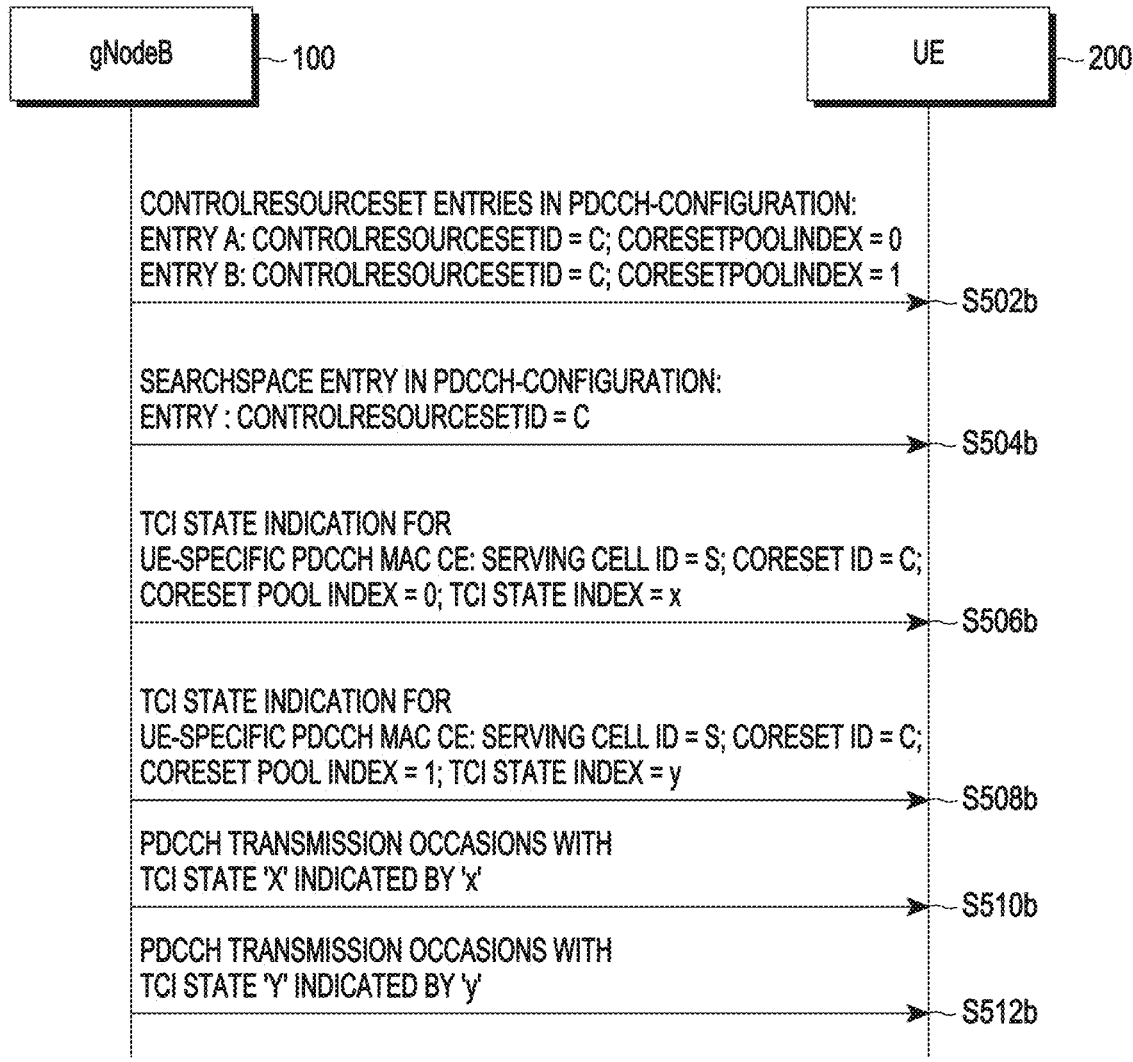
FIG. 5B illustrate a signalling between the gNB and the UE using the second MAC-CE structure, according to the embodiments as disclosed herein.

FIG. 5B illustrate a signalling between the gNB (100) and the UE (200) using the second MAC-CE structure, according to the embodiments as disclosed herein. The operations (S502b-S512b) are performed by the gNB (100).

At S502b-S504b, the gNB (100) maps the multiple TCI states to the single PDCCH information, two entries (i.e. Entry A, Entry B) are added to a controlResourceSetToAddModList-r16 (RRC parameter) of a PDCCH configuration with the same control resource set ID-r16 and a different coresetPoolIndex-r16, and two MAC-CEs for PDCCH TCI indication with the same control resource set ID-r16 and the different coresetPoolIndex-r16 are signalled.

At S506b-s508b, then the gNB (100) configures one or more of the PDCCH transmission occasions mapped to one of the TCI states and remaining one or more of the PDCCH transmission occasions mapped to another of the TCI states associated with the control resource set. At S510b-S512b, for the single TCI state with multiple transmission occasions, a single entry is added to the controlResourceSetToAddModList-r16 of the PDCCH-configuration, configured with the desired control resource set ID-r16 and the desired coresetPoolIndex-r16. And one MAC-CE for PDCCH TCI indication is signalled to the respective control resource set. Which maps all the PDCCH transmission occasions with the TCI state configured to the control resource set.

Figure 5C:
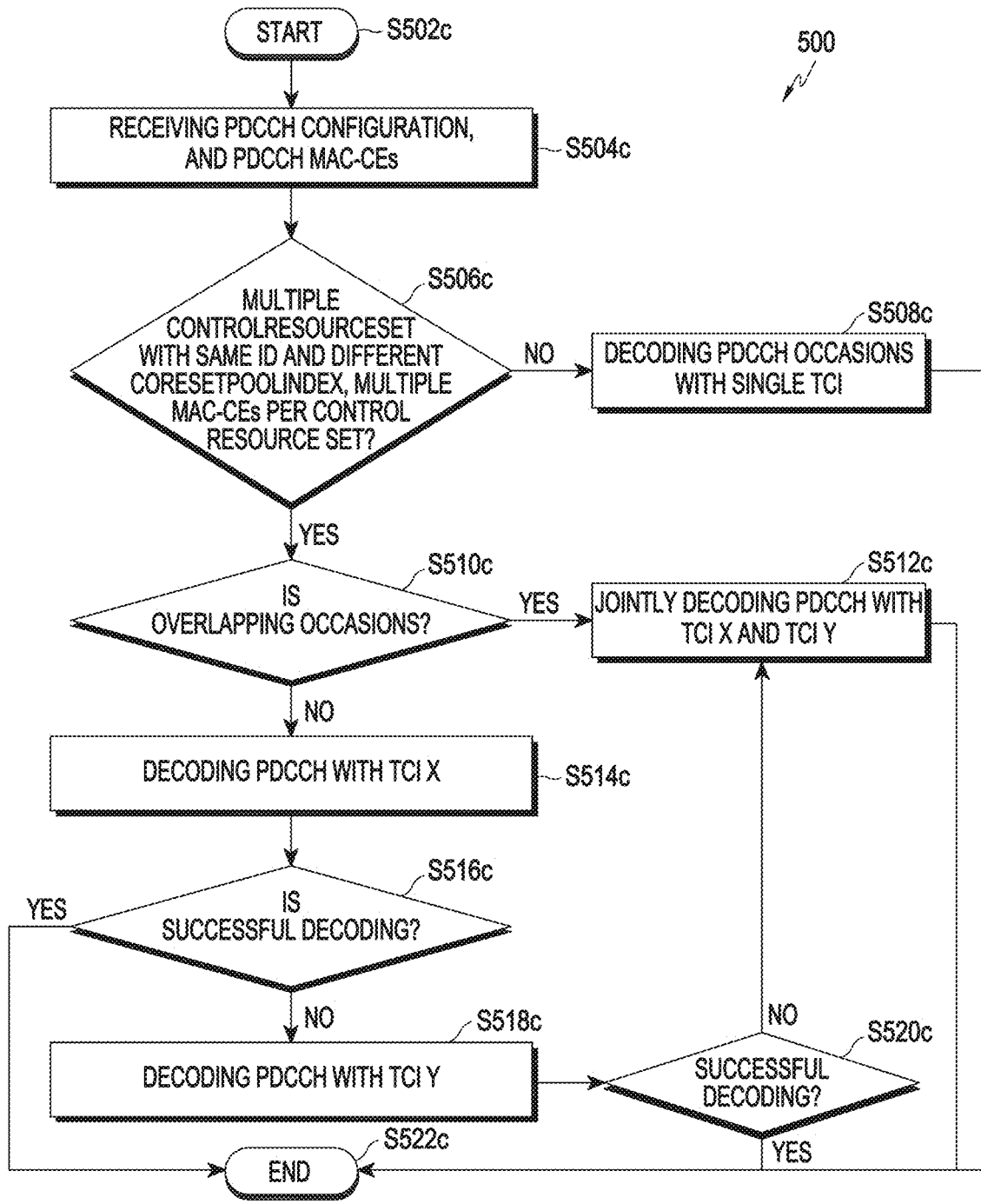
FIG. 5C is a flow diagram illustrating various operations for decoding of the second MAC-CE structure at the UE, according to the embodiments as disclosed herein.

FIG. 5C is a flow diagram illustrating various operations for decoding of the second MAC-CE structure at the UE (200), according to the embodiments as disclosed herein. The operations (S502c-S522c) are performed by the UE (200).

At S502c-S504c, on receiving the PDCCH configuration, and the PDCCH MAC-CEs, two entries in the controlResourceSetToAddModList-r16 with the same control resource set ID-r16 and the different coresetPoolIndex-r16 and the two MAC-CEs indicating the same control resource set ID-r16 and the different coresetPoolIndex-r16, the UE (200) associates one or more of the transmission occasions of the same PDCCH information with one TCI state, and one or more of the transmission occasions of the same PDCCH information with another TCI state.

At S506c, the UE (200) determines whether the received PDCCH information comprises the multiple control resource set with the same ID and the different CoresetPoolIndex, and the multiple MAC-CEs per control resource set. At 508c, the UE (200) decodes the received PDCCH information transmission over the multiple occasions with the single TCI state in response to determining that the received PDCCH information does not comprise the multiple control resource set with the same ID and the different CoresetPoolIndex, and the multiple MAC-CEs per control resource set. At S510c, the UE (200) determines whether the received PDCCH information have the multiple occasions with overlapping in response to determining that the received PDCCH information comprises the multiple control resource set with the same ID and the different CoresetPoolIndex, and the multiple MAC-CEs per control resource set.

At S512c, the UE (200) jointly decodes the received PDCCH information transmission over the multiple occasions with the multiple TCI states in response to determining that the received PDCCH information have the multiple occasions with overlapping. At S514c-S518c, the UE (200) independently decodes the received PDCCH information transmission over the multiple occasions with the multiple TCI states in response to determining that the received PDCCH information have the multiple occasions without overlapping. At S520c-522c, the UE (200) determines whether the independently decodes the received PDCCH information transmission over the multiple occasions with the multiple TCI states is successful. The UE (200) jointly decodes the received PDCCH information transmission over the multiple occasions with the multiple TCI states in response to determining that the independently decodes the received PDCCH information transmission over the multiple occasions with the multiple TCI states is not successful. The UE (200) processes the PDCCH across the multiple occasions is performed by one or more of independently decoding each PDCCH occasion with the respective TCI state and by jointly decoding the PDCCH occasions across one or more of the TCI states.

The various actions, acts, blocks, steps, or the like in the flow diagram (500) may be performed in the order presented, in a different order or simultaneously. Further, in some embodiments, some of the actions, acts, blocks, steps, or the like may be omitted, added, modified, skipped, or the like without departing from the scope of the invention.

Figure 6A:
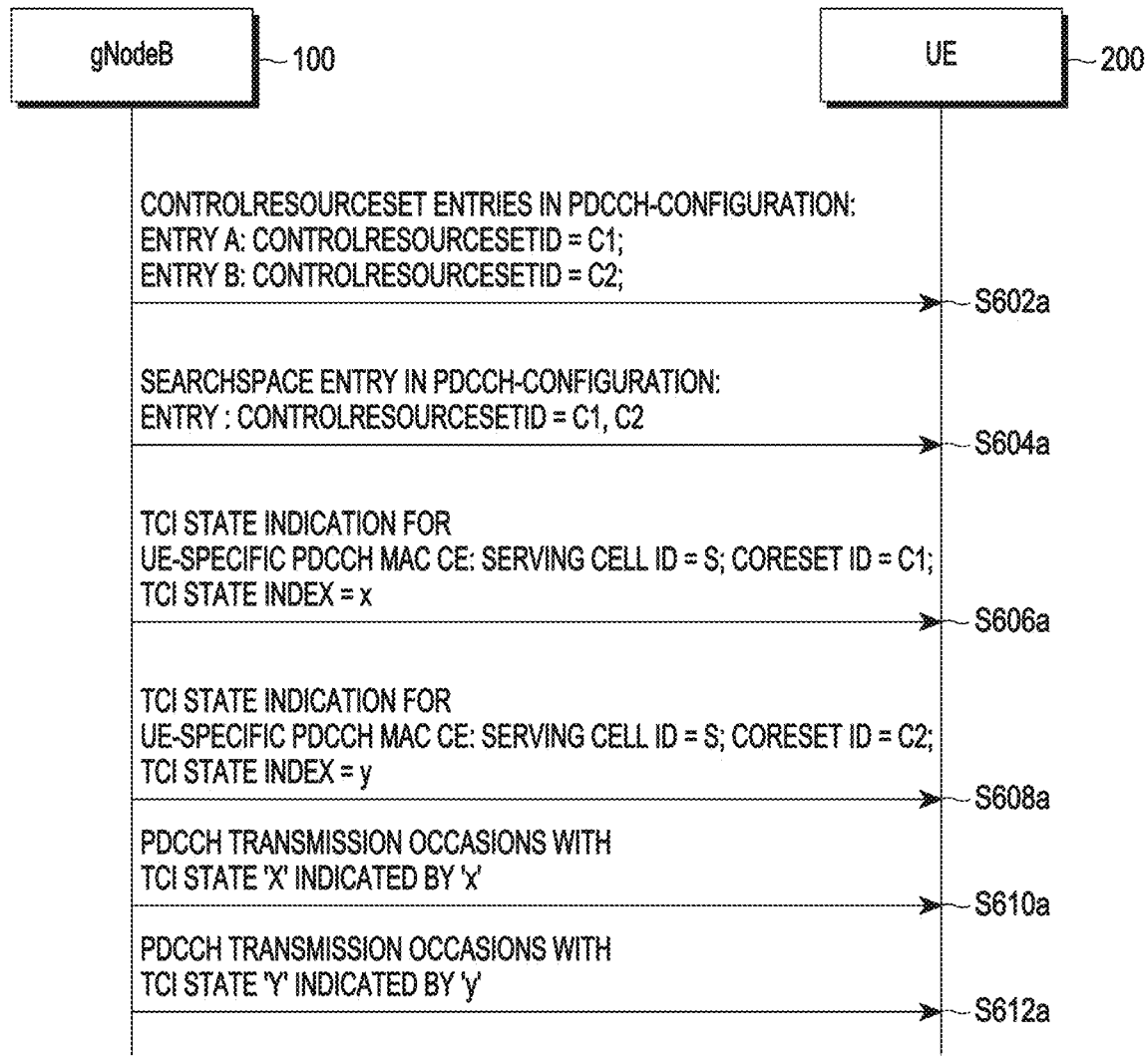
FIG. 6A illustrate a signalling between the gNB and the UE where two control resource sets with different control resource set ID are configured and each mapping to different TCI state, according to the embodiments as disclosed herein.

FIG. 6A illustrates a signalling between the gNB (200) and the UE (100), where two control resource sets with different control resource set ID are configured and each mapping to different TCI state, according to the embodiments as disclosed herein.

To associates the multiple TCI states to the single PDCCH information, two control resource sets with different control resource set ID are configured each mapping to different TCI state. Instead of a single control resource set ID indicated in a search space, a sequence of control resource set ID(s) are indicated mapping to two different control resource sets. Which configures one or more of the PDCCH transmission occasions mapped to one of the TCI states and remaining one or more of the PDCCH transmission occasions mapped to another of the TCI states associated with the control resource set.

The operations (S602a-S612a) are performed by the gNB (100). At S602a-S608a, the gNB (100) maps the multiple TCI states to the single PDCCH information, two entries are added to controlResourceSetToAddModList-r16 of the PDCCH configuration with the different control resource set ID-r16, and two MAC-CEs for PDCCH TCI indication with the respective control resource set ID-r16 are signalled, mapping to different TCI states. Now in the search space, instead of the single control resource set ID, a sequence of control resource set ID(s) are indicated, each mapping to different TCI states. At S610a-S612a, which configures one or more of the PDCCH transmission occasions mapped to one of the TCI states and remaining one or more of the PDCCH transmission occasions mapped to another of the TCI states indicated by the respective MAC-CEs.

Figure 6B:
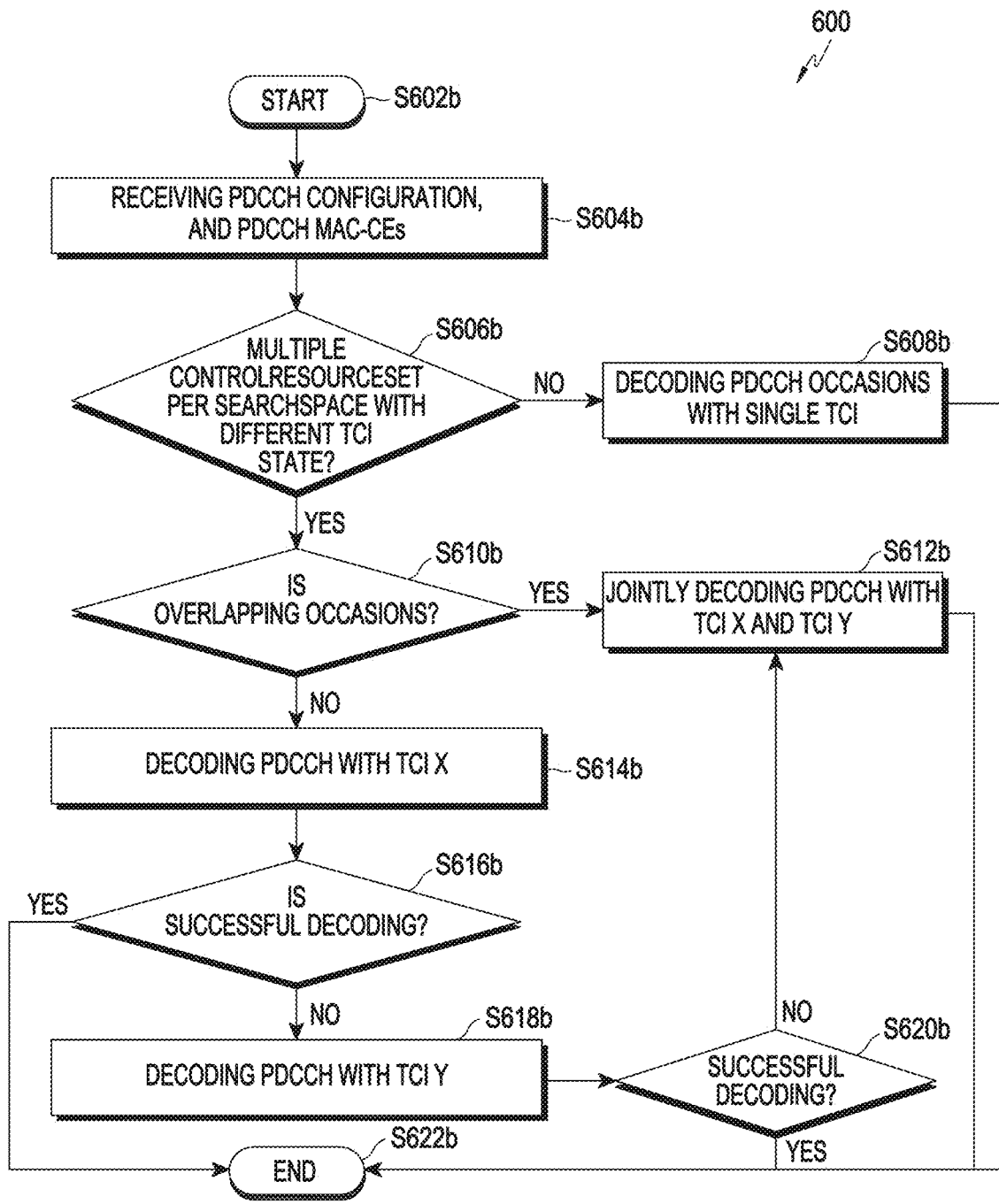
FIG. 6B is a flow diagram illustrating various operations for decoding of the second MAC-CE structure at the UE where two control resource sets with different control resource set ID are configured and each mapping to different TCI state, according to the embodiments as disclosed herein.

FIG. 6B is a flow diagram illustrating various operations for decoding of the second MAC-CE structure at the UE (200), where two control resource sets with different control resource set Id are configured and each mapping to different TCI state, according to the embodiments as disclosed herein. The operations (S602b-S622b) are performed by the UE (200).

At S602b-S604b, on receiving a search space mapping to two control resource sets and MAC-CEs for the respective control resource sets mapping to different TCI states, the UE (200) expects one or more of the configured PDCCH transmission occasions mapped to one of the TCI states and one or more of the configured PDCCH transmission occasions are mapped to another of the TCI states indicated by the respective MAC-CE.

At S606b, the UE (200) determines whether the received PDCCH information comprises multiple control resource sets per search space with different TCI states. At S608b, the UE (200) decodes the received PDCCH information transmission over the multiple occasions with the single TCI state in response to determining that the received PDCCH information does not comprise multiple control resource sets per search space with different TCI states. At 610b, the UE (200) determines whether the received PDCCH information have the multiple occasions with overlapping in response to determining that the received PDCCH information comprises multiple control resource sets per search space with different TCI states.

At 612b, the UE (200) jointly decodes the received PDCCH information transmission over the multiple occasions with the multiple TCI states in response to determining that the received PDCCH information have the multiple occasions with overlapping. At S614b-S618b, the UE (200) independently decodes the received PDCCH information transmission over the multiple occasions with the multiple TCI states in response to determining that the received PDCCH information have the multiple occasions without overlapping. At S620b-622b, the UE (200) determines whether the independently decodes the received PDCCH information transmission over the multiple occasions with the multiple TCI states is successful. The UE (200) jointly decodes the received PDCCH information transmission over the multiple occasions with the multiple TCI states in response to determining that the independently decodes the received PDCCH information transmission over the multiple occasions with the multiple TCI states is not successful. The UE (200) processes the PDCCH across the multiple occasions is performed by one or more of independently decoding each PDCCH occasion with the respective TCI state and by jointly decoding the PDCCH occasions across one or more of the TCI states.

The various actions, acts, blocks, steps, or the like in the flow diagram (600) may be performed in the order presented, in a different order or simultaneously. Further, in some embodiments, some of the actions, acts, blocks, steps, or the like may be omitted, added, modified, skipped, or the like without departing from the scope of the invention.

Figure 7A:
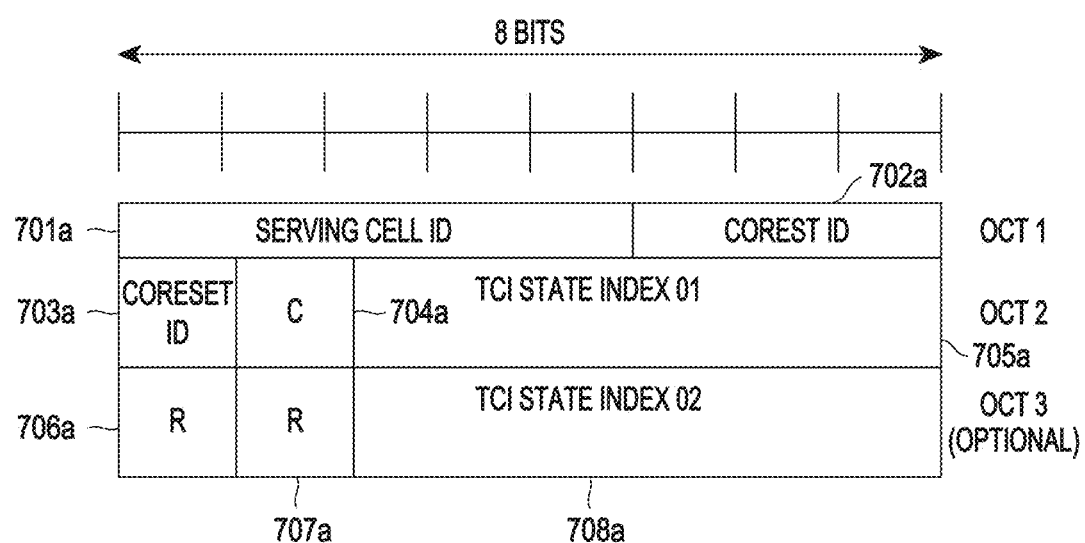
FIG. 7A illustrate a third MAC-CE structure for improving the reliability of the PDCCH in the wireless network, according to the embodiments as disclosed herein.

FIG. 7A illustrate a third MAC-CE structure for improving the reliability of the PDCCH in the wireless network, according to the embodiments as disclosed herein.

In an embodiment, the third MAC-CE structure/proposed MAC-CE structure associates the multiple TCI states to the single control resource set, the MAC-CE structure indicating TCI state for UE-specific PDCCH. The third MAC-CE structure contains a one-bit information namely C (i.e. C) (704a) along with the serving cell ID (701a) and coreset ID (702a, 703a). On setting the field C (704a) to zero, the single TCI State is indicated represented by TCI state index01 (705a) of length 6 bits. On setting the field C (704a) to a non-zero value, two TCI states are indicated represented by TCI state index01 (705a) and TCI state index02 (708a) each of length 6 bits as represented in FIG. 7A. The third MAC-CE has three 8-bit structure of which the last 8 bits are optional. On setting the field C (704a) to zero, the last 8 bits of the third MAC-CE are absent.

In an embodiment, the TCI state index01 (705a) field indicates the index of the TCI state applicable to the control resource set identified by coreset ID field. If the field of coreset ID (702a, 703a) is set to 0, the field indicates index of the TCI state from the first 64 TCI-states configured by tci-States-ToAddModList and tci-States-ToReleaseList in the PDSCH configuration in the active BWP. If the field of coreset ID (702a, 703a) is set to the other value than 0, the field indicates index of the TCI state configured by tci-StatesPDCCH-ToAddList and tci-StatesPDCCH-ToReleaseList in the control resource set identified by the indicated coreset ID. The length of the field (705a) is 6 bits.

In an embodiment, the TCI state index02 (708a) indicates the index of the additional TCI state applicable to the control resource set identified by coreset ID field (702a, 703a). If the field of C (704a) is set to 0, the field TCI state index02 (708a) will be absent. If the field of C (704a) is set to 1, the field TCI state index02 (708a) is present. If the field TCI state index02 (708a) is present and the field of coreset ID (702a, 703a) is set to 0, this field indicates index of the TCI state from the first 64 TCI-states configured by tci-States-ToAddModList and tci-States-ToReleaseList in the PDSCH configuration in the active BWP. If the field TCI state index02 (708a) is present and the field of coreset ID (702a, 703a) is set to the other value than 0, this field indicates index of the TCI state configured by tci-StatesPDCCH-ToAddList and tci-StatesPDCCH-ToReleaseList in the control resource set identified by the indicated coreset ID. The length of the field (708a) is 6 bits.

In an embodiment, the C (704a) indicates one bit field represents whether the MAC-CE indicates the single TCI state or the multiple TCI states for the control resource set identified by the indicated coreset ID. Setting the value to 0 indicates the TCI state derived from TCI state index01 (705a) to be associated with the control resource set. Setting the value to 1 indicates the presence of the TCI state derived from TCI State Index01 (705a) and an additional TCI state derived from TCI state index02 (708a), both to be associated with the control resource set.

In an embodiment, the R (706a, 707a) indicates reserved bit, set to 0.

Figure 7B:
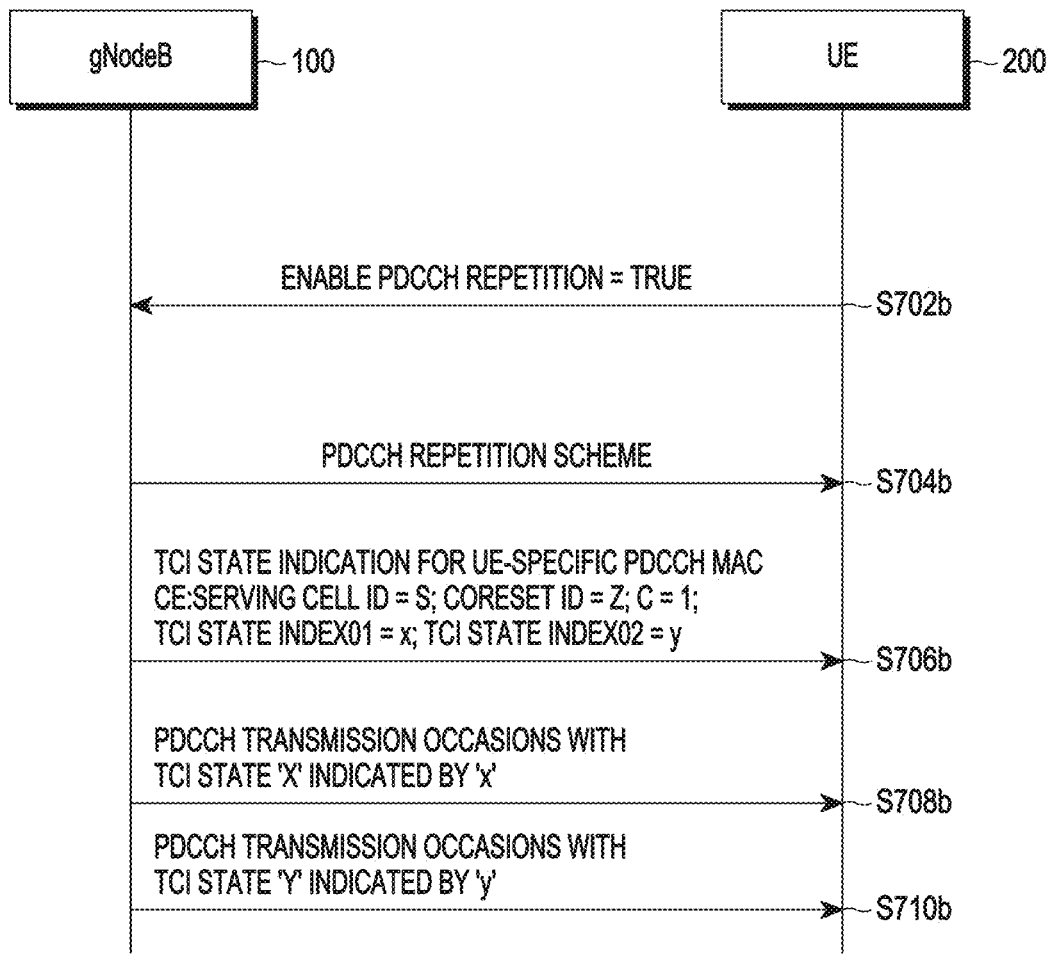
FIG. 7B illustrate a signalling between the gNB and the UE using the third MAC-CE structure, according to the embodiments as disclosed herein.

FIG. 7B illustrate a signalling between the gNB (100) and the UE (200) using the third MAC-CE structure, according to the embodiments as disclosed herein. The operations (S702b-S710b) are performed by the gNB (100).

At S702b, on receiving a signal 'enablePDCCRepetition' from the UE (200) indicating capability of the UE (200) to support PDCCH transmission over multiple occasions. At S704, the gNB (100) configures the UE using a Radio Resource Control (RRC) parameter 'PDCCHRepetitionScheme' indicating the UE (200) that the same PDCCH information is transmitted over multiple transmission occasions.

At S706b, the gNB (100) associates the multiple TCI states to the single PDCCH information, a MAC-CE with the variable C set to one and different TCI state index01 and TCI state index02 values is signalled each mapping the same control resource set identified by the indicated coreset ID. At S708b-S710b, which configures one or more of the PDCCH transmission occasions mapped to one of the TCI states and remaining one or more of the PDCCH transmission occasions mapped to another of the TCI states, indicated by the respective MAC-CEs.

For the case of multiple transmission occasions with the single TCI state, a MAC-CE with the variable C set to zero is signalled mapping a desired TCI state indicated by TCI state index01 to the control resource set identified by the indicated coreset ID. Now all the PDCCH transmission occasions are mapped to the TCI state indicated by the MAC-CE.

Figure 7C:
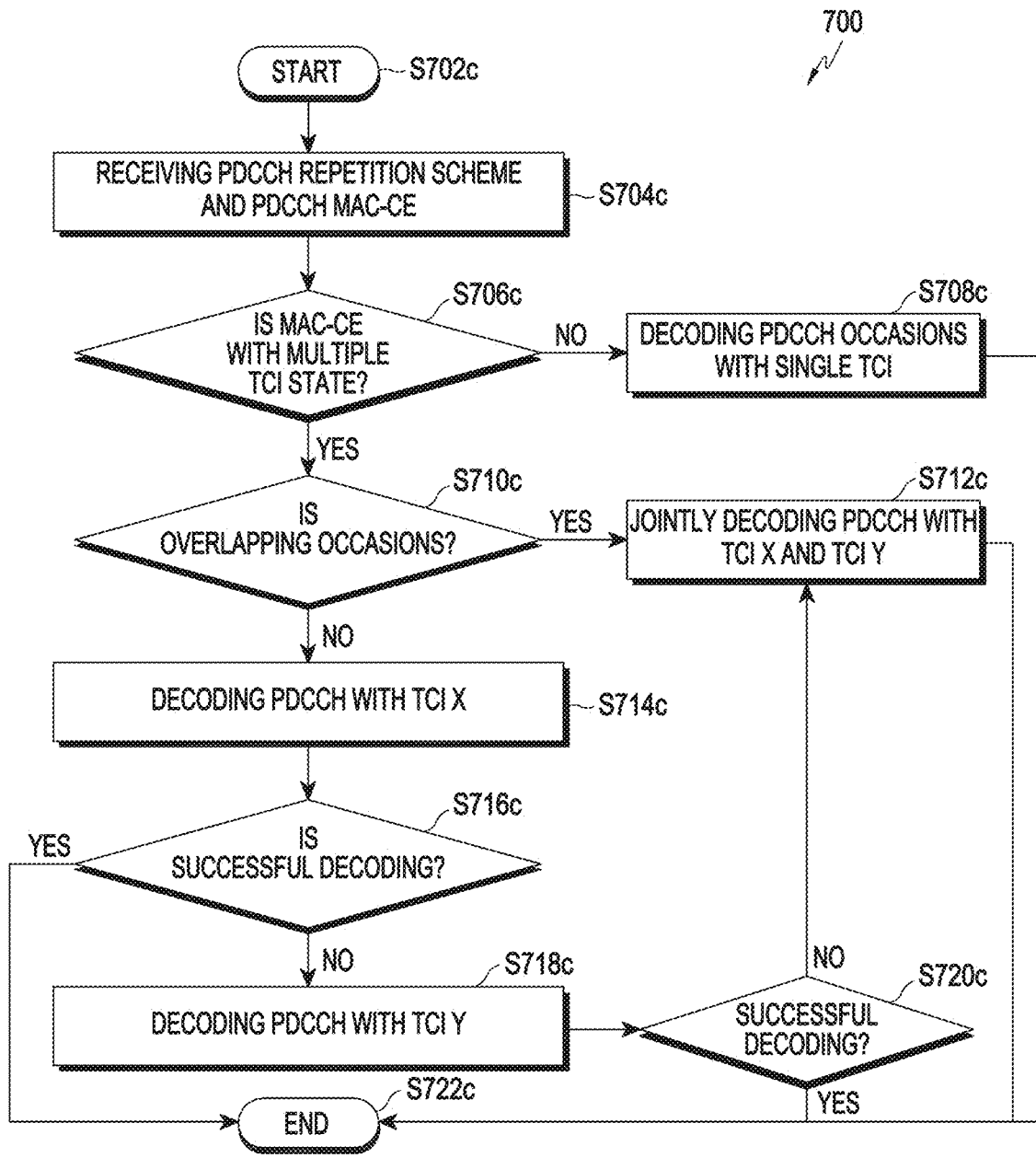
FIG. 7C is a flow diagram illustrating various operations for decoding of the third MAC-CE structure at the UE, according to the embodiments as disclosed herein.

FIG. 7C is a flow diagram (S700) illustrating various operations for decoding of the third MAC-CE structure at the UE (200), according to the embodiments as disclosed herein. The operations (S702c-S722c) are performed by the UE (200).

At S702c-S704c, on receiving the RRC parameter 'PDCCHRepetitionScheme' and the MAC-CE with the variable C set to one and different TCI state index01 and TCI state index02 values is signalled each mapping the same control resource set identified by the indicated coreset ID, the UE expects one or more of the configured PDCCH transmission occasions mapped to one of the TCI states and one or more of the configured PDCCH transmission occasions are mapped to another of the TCI states.

At S706c, the UE (200) determines whether the received MAC-CE comprises the multiple TCI states. At S708c, the UE (200) decodes the received PDCCH information transmission over the multiple occasions with the single TCI state in response to determining that the received MAC-CE does not comprise the multiple TCI states. At S710c, the UE (200) determines whether the received PDCCH information have the multiple occasions with overlapping in response to determining that the received MAC-CE comprises the multiple TCI states.

At S712c, the UE (200) jointly decodes the received PDCCH information transmission over the multiple occasions with the multiple TCI states in response to determining that the received PDCCH information have the multiple occasions with overlapping. At S714c-718c, the UE (200) independently decodes the received PDCCH information transmission over the multiple occasions with the multiple TCI states in response to determining that the received PDCCH information have the multiple occasions without overlapping. At S720c-S722, the UE (200) determines whether the independently decodes the received PDCCH information transmission over the multiple occasions with the multiple TCI states is successful. The UE (200) jointly decodes the received PDCCH information transmission over the multiple occasions with the multiple TCI states in response to determining that the independently decodes the received PDCCH information transmission over the multiple occasions with the multiple TCI states is not successful. The UE (200) processes the PDCCH across the multiple occasions is performed by one or more of independently decoding each PDCCH occasion with the respective TCI state and by jointly decoding the PDCCH occasions across one or more of the TCI states.

The various actions, acts, blocks, steps, or the like in the flow diagram (700) may be performed in the order presented, in a different order or simultaneously. Further, in some embodiments, some of the actions, acts, blocks, steps, or the like may be omitted, added, modified, skipped, or the like without departing from the scope of the invention.

Figure 8A:
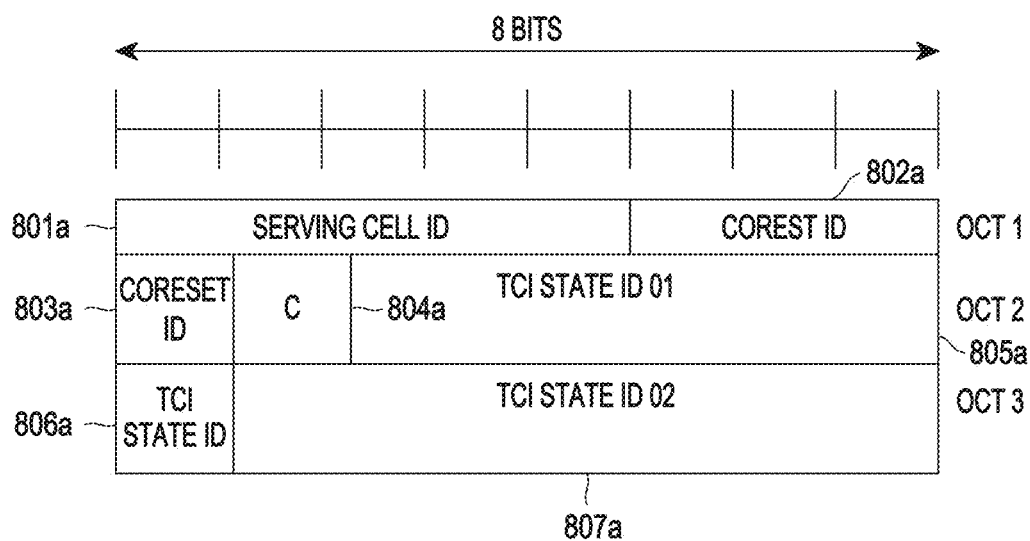
FIGS. 8A and 8B illustrate fourth MAC-CE structures for improving the reliability of the PDCCH in the wireless network, according to the embodiments as disclosed herein.
Figure 8B:
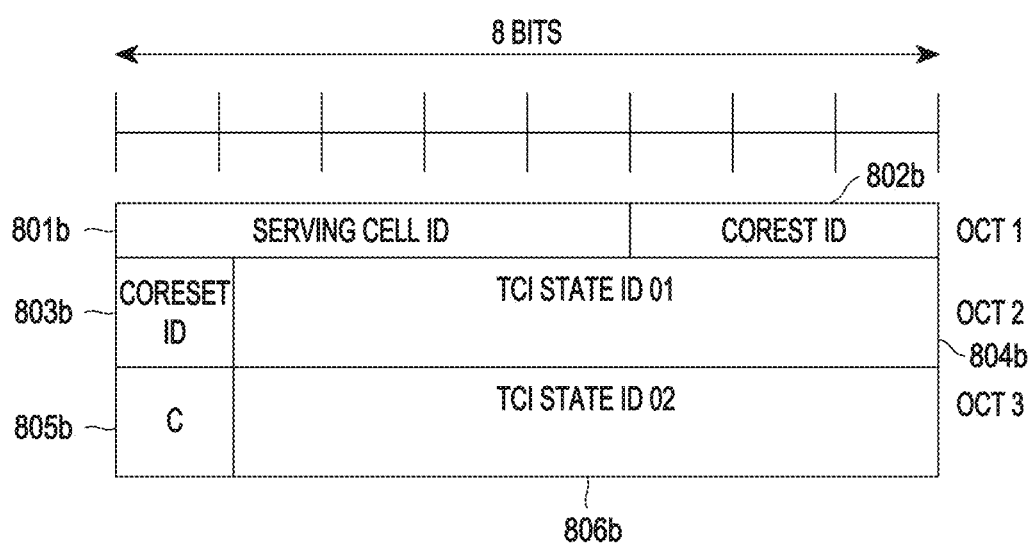

FIGS. 8A-8B illustrate fourth MAC-CE structures for improving the reliability of the PDCCH in the wireless network, according to the embodiments as disclosed herein, In an embodiment, the fourth MAC-CE structure/proposed MAC-CE structure associates the multiple TCI states to a single control resource set, the MAC-CE indicating TCI state for UE-specific PDCCH is defined as two structures. The proposed MAC-CE structures contains a one bit information namely C (804a, 805b) along with the serving cell ID (801a, 801b) and coreset ID (802a, 803a, 802b, 803b). On setting the field C (804a, 805b) to 0, the single TCI State is indicated represented by TCI State ID01 (805a, 804b) of length 7 bits. On setting the field C (804a, 805b) to a value other than 0, two TCI States are indicated represented by TCI state ID01 (805a, 804b) and TCI state ID02 (807a, 806b) each of length 7 bits.

In an embodiment, the TCI state ID01 (805a, 804b) field indicates the TCI state identified by TCI state ID as specified in TS 38.331 applicable to the control resource set identified by coreset ID field. If the field of coreset ID (802a, 803a, 802b, 803b) is set to 0, this field indicates a TCI state ID for a TCI state of the first 64 TCI-states configured by tci-States-ToAddModList and tci-States-ToReleaseList in the PDSCH configuration in the active BWP. If the field of coreset ID (802a, 803a, 802b, 803b) is set to the other value than 0, the field indicates a TCI state ID configured by tci-StatesPDCCH-ToAddList and tci-StatesPDCCH-ToReleaseList in the control resource set identified by the indicated coreset ID (802a, 803a, 802b, 803b). The length of the field (805a, 804b) is 7 bits.

In an embodiment, the TCI state ID02 (807a, 806b) field indicates the additional TCI state identified by TCI state ID as specified in TS 38.331 applicable to the control resource set identified by coreset ID field. If the field of C (804a, 805b) is set to 0, the field TCI state ID02 (807a, 806b) is set to zero. If the field of C (804a, 805b) is set to 1, the field TCI state ID02 (807a, 806b) is set to the desired TCI state ID. If the field of coreset ID (802a, 803a, 802b, 803b) is set to 0, this field indicates index of the TCI state from the first 64 TCI-states configured by tci-States-ToAddModList and tci-States-ToReleaseList in the PDSCH configuration in the active BWP. If the field of coreset ID (802a, 803a, 802b, 803b) is set to the other value than 0, this field indicates index of the TCI state configured by tci-StatesPDCCH-ToAddList and tci-StatesPDCCH-ToReleaseList in the control resource set identified by the indicated coreset ID. The length of the field (807a, 806b) is 7 bits.

In an embodiment, the C (804a, 805b) indicates one bit field represents whether the MAC-CE indicates the single TCI state or the multiple TCI states for the control resource set identified by the indicated coreset ID (802a, 803a, 802b, 803b). Setting the value to 0 indicates the TCI state indicated by TCI state ID01 (805a, 804b) to be associated with the control resource set. Setting the value to 1 indicates the presence of the TCI state indicated by the TCI state ID01 (805a, 804b) and an additional TCI state indicated by TCI state ID02 (807a, 806b), both to be associated with the control resource set.

In another embodiment, the C (804a, 805b) indicates one bit field represents a reserved information. Irrespective of the value of C set to 0 or other than 0, the TCI state indicated by the TCI state ID01 (805a, 804b) and an additional TCI state indicated by TCI state ID02 (807a, 806b), both are to be associated with the control resource set.

Figure 8C:
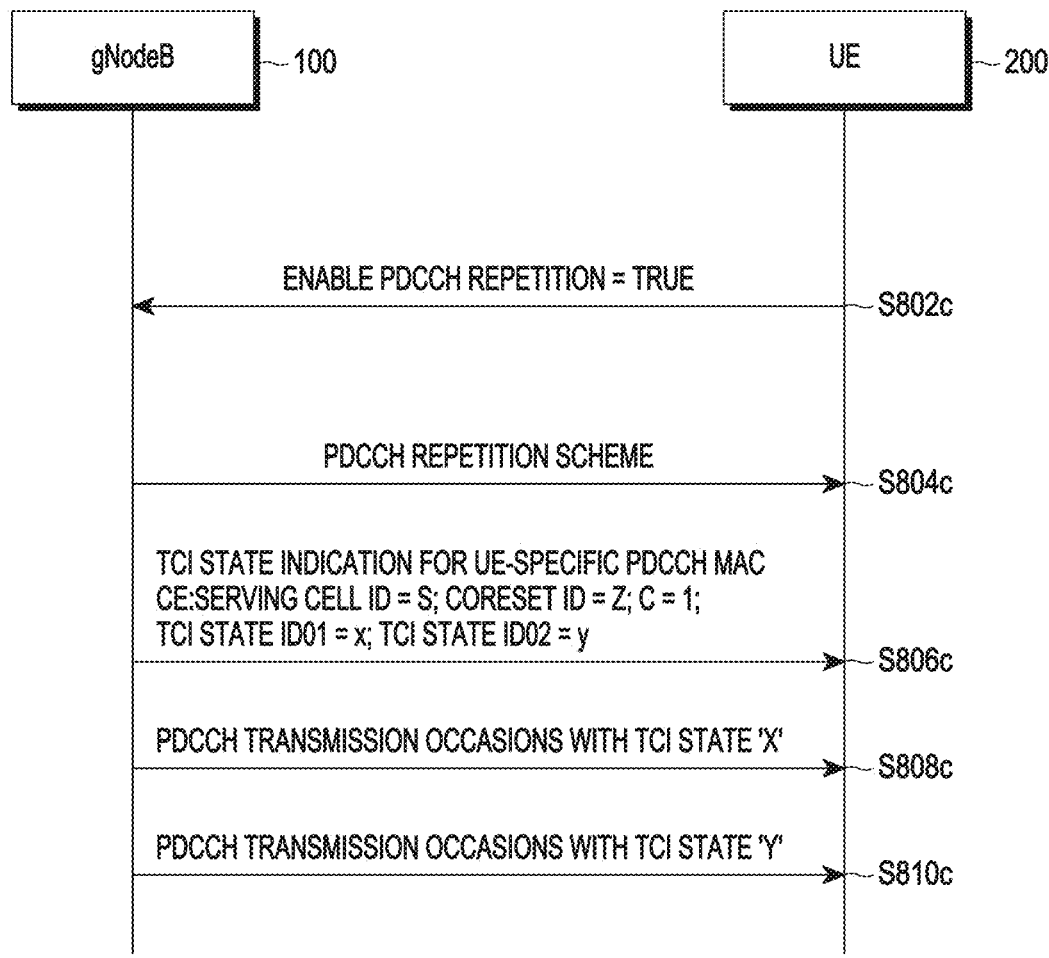
FIGS. 8C and 8D illustrate a signalling between the gNB and the UE using the fourth MAC-CE structure, according to the embodiments as disclosed herein.
Figure 8D:
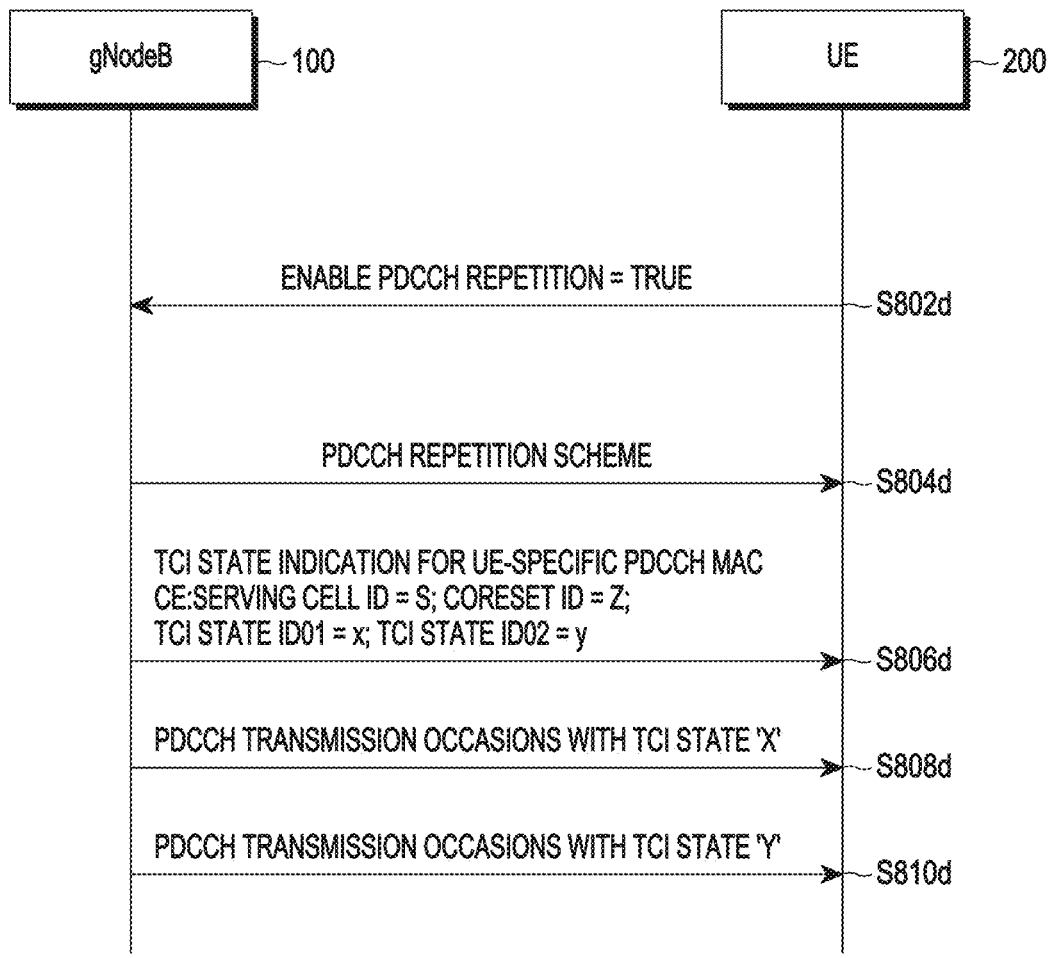

FIG. 8C-8D illustrate a signalling between the gNB (100) and the UE (200) using the fourth MAC-CE structure, according to the embodiments as disclosed herein. The operations (S802c-S810c), (S802d-S810d) are performed by the gNB (100).

Referring to FIG. 8C: at S802c, on receiving a signal 'enablePDCCRepetition' from the UE (200) indicating capability of the UE (200) to support PDCCH transmission over multiple occasions. At S804c, the gNodeB (100) configures the UE (200) using the RRC parameter 'PDCCHRepetitionScheme' indicating the UE (200) that the same PDCCH information is transmitted over multiple transmission occasions.

At S806c, the gNB (100) associates the multiple TCI states to the single PDCCH information, the MAC-CE with the variable C set to one and different TCI state ID01 and TCI state ID02 values are signalled each mapping the same control resource set identified by the indicated coreset ID. At S808c-810c, then the gNB (100) configures one or more of the PDCCH transmission occasions mapped to one of the TCI states and remaining one or more of the PDCCH transmission occasions mapped to another of the TCI states, indicated by the respective MAC-CEs.

For the case of multiple transmission occasions with the single TCI state, a MAC-CE with the variable C set to zero is signalled mapping a desired TCI state indicated by TCI State ID01 to the control resource set identified by the indicated coreset ID. Now all the PDCCH transmission occasions are mapped to the TCI state indicated by the MAC-CE.

Referring to FIG. 8d: at S802d, on receiving a signal 'enablePDCCRepetition' from the UE (200) indicating capability of the UE (200) to support PDCCH transmission over multiple occasions. At S804d, the gNodeB (100) configures the UE (200) using the RRC parameter 'PDCCHRepetitionScheme' indicating the UE (200) that the same PDCCH information is transmitted over multiple transmission occasions.

At S806d, the gNB (100) associates the multiple TCI states to the single PDCCH information, the MAC-CE with different TCI state ID01 and TCI state ID02 values are signalled each mapping the same control resource set identified by the indicated coreset ID. At S808d-810d, then the gNB (100) configures one or more of the PDCCH transmission occasions mapped to one of the TCI states and remaining one or more of the PDCCH transmission occasions mapped to another of the TCI states, indicated by the respective MAC-CEs.

Figure 8E:
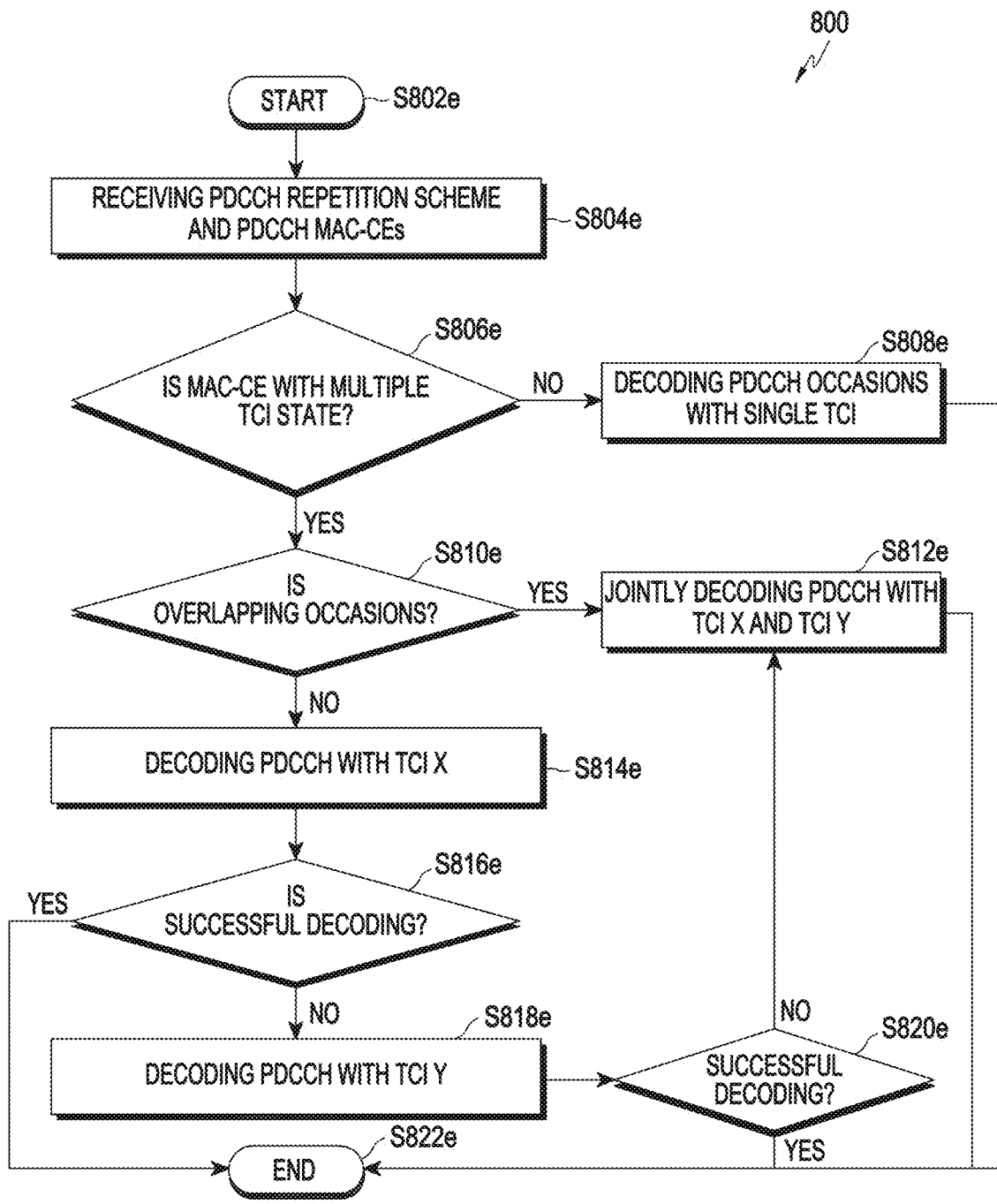
FIG. 8E is a flow diagram illustrating various operations for decoding of the fourth MAC-CE structure at the UE, according to the embodiments as disclosed herein.

FIG. 8E is a flow diagram (800) illustrating various operations for decoding the fourth MAC-CE structure at the UE (200), according to the embodiments as disclosed herein. The operations (S802d-S822d) are performed by the UE (200).

At S802e-S804e, on receiving the RRC parameter 'PDCCHRepetitionScheme' and the MAC-CE with the variable C set to one or other than one and different TCI state ID01 and TCI state ID02 values is signalled each mapping the same control resource set identified by the indicated coreset ID, the UE (200) expects one or more of the configured PDCCH transmission occasions mapped to one of the TCI states and one or more of the configured PDCCH transmission occasions are mapped to another of the TCI states.

At S806e, the UE (200) determines whether the received MAC-CE comprises the multiple TCI states. At S808e, the UE (200) decodes the received PDCCH information transmission over the multiple occasions with the single TCI state in response to determining that the received MAC-CE does not comprise the multiple TCI states. At S810e, the UE (200) determines whether the received PDCCH information have the multiple occasions with overlapping in response to determining that the received MAC-CE comprises the multiple TCI states.

At 812e, the UE (200) jointly decodes the received PDCCH information transmission over the multiple occasions with the multiple TCI states in response to determining that the received PDCCH information have the multiple occasions with overlapping. At S814e-818e, the UE (200) independently decodes the received PDCCH information transmission over the multiple occasions with the multiple TCI states in response to determining that the received PDCCH information have the multiple occasions without overlapping. At S820e-S822e, the UE (200) determines whether the independently decodes the received PDCCH information transmission over the multiple occasions with the multiple TCI states is successful. The UE (200) jointly decodes the received PDCCH information transmission over the multiple occasions with the multiple TCI states in response to determining that the independently decodes the received PDCCH information transmission over the multiple occasions with the multiple TCI states is not successful. The UE (200) processes the PDCCH across the multiple occasions is performed by one or more of independently decoding each PDCCH occasion with the respective TCI state and by jointly decoding the PDCCH occasions across one or more of the TCI states.

The various actions, acts, blocks, steps, or the like in the flow diagram (800) may be performed in the order presented, in a different order or simultaneously. Further, in some embodiments, some of the actions, acts, blocks, steps, or the like may be omitted, added, modified, skipped, or the like without departing from the scope of the invention.

The various actions, acts, blocks, steps, or the like in the flow diagram (900) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for improving a reliability of a physical downlink control channel (PDCCH) in a wireless network by a gNodeB (gNB), the method comprising:
    receiving an enable PDCCH repetition signal from a user equipment (UE), wherein the enable PDCCH repetition signal indicates a capability of the UE to support a PDCCH information transmission over a plurality of occasions;
    configuring a radio resource control (RRC) parameter associated with a plurality of transmission configuration information (TCI) states to PDCCH information; and
    transmitting, to the UE, a PDCCH repetition scheme signal including the RRC parameter,
    wherein the plurality of TCI states are configured by a medium access control (MAC)-control element (CE),
    wherein a structure of the MAC-CE comprises three 8-bit structures,
    wherein a first 8-bit structure of the MAC-CE comprises 5 bits of a serving cell identifier (ID) and 3 bits of a control resource set (CORESET) ID,
    wherein a second 8-bit structure of the MAC-CE comprises 1 bit of the CORESET ID and 7 bits of a first TCI state, and
    wherein a third 8-bit structure of the MAC-CE comprises 1 bit of a candidate bit and 7 bits of a second TCI state.

2. The method of claim 1, wherein the plurality of occasions are based on at least one of a time domain resource, a frequency domain resource, or a space domain resource of an orthogonal frequency-division multiplexing (OFDM) signal.

3. The method of claim 1, wherein the plurality of TCI states are configured by the MAC-CE by transmitting one of:
    a plurality of MAC-CEs per CORESET to the UE in the PDCCH information;
    a plurality of CORESETs set with a same ID and a different candidate bit, and the plurality of MAC-CEs per CORESET to the UE in the PDCCH information;
    a plurality of CORESETs per search space with different TCI states to the UE in the PDCCH information; or
    the MAC-CE including the plurality of TCI states to the UE in the PDCCH information.

4. A method for improving a reliability of a physical downlink control channel (PDCCH) in a wireless network by a user equipment (UE), the method comprising:
    transmitting an enable PDCCH repetition signal to a gNode B (gNB), wherein the enable PDCCH repetition signal indicates a capability of the UE to support a PDCCH information transmission over a plurality of occasions; and
    receiving, from the gNB, a PDCCH repetition scheme signal including a radio resource control (RRC) parameter associated with a plurality of transmission configuration information (TCI) states to PDCCH information,
    wherein the plurality of TCI states are configured by a medium access control (MAC)-control element (CE),
    wherein a structure of the MAC-CE comprises three 8-bit structures,
    wherein a first 8-bit structure of the MAC-CE comprises 5 bits of a serving cell identifier (ID) and 3 bits of a control resource set (CORESET) ID, wherein a second 8-bit structure of the MAC-CE comprises 1 bit of the CORESET ID and 7 bits of a first TCI state, and wherein a third 8-bit structure of the MAC-CE comprises 1 bit of a candidate bit and 7 bits of a second TCI state.

5. The method of claim 4, wherein the plurality of occasions are based on at least one of a time domain resource, a frequency domain resource, or a space domain resource of an orthogonal frequency-division multiplexing (OFDM) signal.

6. The method of claim 4, wherein the plurality of TCI states are configured by the MAC-CE by transmitting one of:
   a plurality of MAC-CEs per CORESET to the UE in the PDCCH information;
   a plurality of CORESET sets with a same ID and a different candidate bit, and the plurality of MAC-CEs per CORESET to the UE in the PDCCH information;
   a plurality of CORESETs per search space with different TCI states to the UE in the PDCCH information; or
   the MAC-CE including the plurality of TCI states to the UE in the PDCCH information.

7. A gNodeB (gNB) for improving reliability of a physical downlink control channel (PDCCH) in a wireless network, the gNB comprising:
   a transceiver; and
   a processor coupled to the transceiver, wherein the processor is configured to:
      receive an enable PDCCH repetition signal from a user equipment (UE), wherein the enable PDCCH repetition signal indicates a capability of the UE to support a PDCCH information transmission over a plurality of occasions,
      configure a radio resource control (RRC) parameter associated with a plurality of transmission configuration information (TCI) states to PDCCH information, and
      transmitting, to the UE, a PDCCH repetition scheme signal including the RRC parameter,
   wherein the plurality of TCI states are configured by a medium access control (MAC)-control element (CE),
   wherein a structure of the MAC-CE comprises three 8-bit structures,
   wherein a first 8-bit structure of the MAC-CE comprises 5 bits of a serving cell identifier (ID) and 3 bits of a control resource set (CORESET) ID,
   wherein a second 8-bit structure of the MAC-CE comprises 1 bit of the CORESET ID and 7 bits of a first TCI state, and
   wherein a third 8-bit structure of the MAC-CE comprises 1 bit of a candidate bit and 7 bits of a second TCI state.

8. The gNB of claim 7, wherein the plurality of occasions are based on at least one of a time domain resource, a frequency domain resource, or a space domain resource of an orthogonal frequency-division multiplexing (OFDM) signal.

9. The gNB of claim 7, wherein the plurality of TCI states are configured by the MAC-CE by transmitting one of:
   a plurality of MAC-CEs per CORESET to the UE in the PDCCH information;
   a plurality of CORESETs set with a same ID and a different candidate bit, and the plurality of MAC-CEs per CORESET to the UE in the PDCCH information;
   a plurality of CORESETs per search space with different TCI states to the UE in the PDCCH information; or
   the MAC-CE including the plurality of TCI states to the UE in the PDCCH information.

10. A user equipment (UE) for improving reliability of a physical downlink control channel (PDCCH) in a wireless network, the UE comprising:
   a transceiver; and
   a processor coupled to the transceiver, wherein the processor is configured to:
      transmit an enable PDCCH repetition signal to a gNode B (gNB), wherein the enable PDCCH repetition signal indicates a capability of the UE to support a PDCCH information transmission over a plurality of occasions, and
      receive, from the gNB, a PDCCH repetition scheme signal including a radio resource control (RRC) parameter associated with a plurality of transmission configuration information (TCI) states to PDCCH information,
   wherein the plurality of TCI states are configured by a configured medium access control (MAC)-control element (CE),
   wherein a structure of the MAC-CE comprises three 8-bit structures,
   wherein a first 8-bit structure of the MAC-CE comprises 5 bits of a serving cell identifier (ID) and 3 bits of a control resource set (CORESET) ID,
   wherein a second 8-bit structure of the MAC-CE comprises 1 bit of the CORESET ID and 7 bits of a first TCI state, and
   wherein a third 8-bit structure of the MAC-CE comprises 1 bit of a candidate bit and 7 bits of a second TCI state.

11. The UE of claim 10, wherein the plurality of occasions are based on at least one of a time domain resource, a frequency domain resource, or a space domain resource of an orthogonal frequency-division multiplexing (OFDM) signal.

12. The UE of claim 10, wherein the plurality of TCI states are configured by the MAC-CE by transmitting one of:
   a plurality of MAC-CEs per CORESET to the UE in the PDCCH information;
   a plurality of CORESETs set with a same ID and a different candidate bit, and the plurality of MAC-CEs per CORESET to the UE in the PDCCH information;
   a plurality of CORESETs per search space with different TCI states to the UE in the PDCCH information; or
   the MAC-CE including the plurality of TCI states to the UE in the PDCCH information.

* * * * *